United States Patent
Shah et al.

(10) Patent No.: US 6,223,339 B1
(45) Date of Patent: *Apr. 24, 2001

(54) SYSTEM, METHOD, AND PRODUCT FOR MEMORY MANAGEMENT IN A DYNAMIC TRANSLATOR

(75) Inventors: Lacky V. Shah, Sunnyvale; James S. Mattson, Jr., Campbell; William B. Buzbee, Half Moon Bay, all of CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,853

(22) Filed: Sep. 8, 1998

(51) Int. Cl.$^7$ ............................................. G06F 1/00
(52) U.S. Cl. ................................. 717/5; 717/5; 717/6
(58) Field of Search ................... 717/5, 6, 9; 710/22; 711/154, 170, 101; 369/1; 235/1

(56) References Cited

U.S. PATENT DOCUMENTS

| | | | |
|---|---|---|---|
| 5,193,180 | * 3/1993 | Hastings | 717/10 |
| 5,335,344 | * 8/1994 | Hastings | 714/35 |
| 5,355,491 | 10/1994 | Lawlor et al. | 717/7 |
| 5,367,685 | 11/1994 | Gosling | 717/7 |
| 5,442,790 | * 8/1995 | Nosenchuck | 717/7 |
| 5,452,457 | 9/1995 | Alpert et al. | 717/9 |
| 5,504,914 | 4/1996 | Lai | 712/226 |
| 5,530,829 | * 6/1996 | Beardsley et al. | 711/113 |
| 5,557,761 | * 9/1996 | Chan et al. | 717/9 |
| 5,581,697 | * 12/1996 | Gramlich et al. | 714/35 |
| 5,644,772 | * 7/1997 | Mann | 710/260 |
| 5,655,121 | * 8/1997 | Delagi et al. | 717/4 |
| 5,713,010 | * 1/1998 | Bubee et al. | 345/507 |

(List continued on next page.)

OTHER PUBLICATIONS

Calder et al, "Fast and accurate instruction fetch and branch prediction", IEEE, pp 2–11, 1994.*

(List continued on next page.)

Primary Examiner—Mark R. Powell
Assistant Examiner—Anil Khatri

(57) ABSTRACT

The present invention is a system, method, and product for improving the speed of dynamic translation systems by efficiently positioning translated instructions in a computer memory unit. More specifically, the speed of execution of translated instructions, which is a factor of particular relevance to dynamic optimization systems, may be adversely affected by inefficient jumping between traces of translated instructions. The present invention efficiently positions the traces with respect to each other and with respect to "trampoline" instructions that redirect control flow from the traces. For example, trampoline instructions may redirect control flow to an instruction emulator if the target instruction has not been translated, or to the translation of a target instruction that has been translated. When a target instruction has been translated, a backpatcher of the invention may directly backpatch the jump to the target so that the trampoline instructions are no longer needed. A method of the present invention includes: (1) designating "chunks" of memory locations, and (2) positioning a translated trace and its corresponding trampoline instructions in the same chunk. The size of the chunk generally is based on a "machine-specific shortest jump distance" that is the shortest maximum distance that a jump instruction may specify. In particular, the chunk length may be determined so that, for every translated trace and trampoline instruction positioned in the same chunk, the greatest distance between a translated jump instruction and its target trampoline instruction is not greater than the machine-specific shortest jump distance for that type of jump instruction.

72 Claims, 6 Drawing Sheets

U.S. PATENT DOCUMENTS

| | | | | |
|---|---|---|---|---|
| 5,732,210 | * | 3/1998 | Buzbee | 714/38 |
| 5,758,140 | * | 5/1998 | Kahle et al. | 712/227 |
| 5,815,720 | * | 9/1998 | Buzbee | 717/9 |
| 5,835,788 | * | 11/1998 | Blumer et al. | 710/23 |
| 5,909,578 | * | 6/1999 | Buzbee | 717/4 |
| 5,930,829 | * | 7/1999 | Little | 711/710 |
| 5,933,622 | * | 8/1999 | Buzbee et al. | 703/22 |
| 5,943,504 | * | 8/1999 | Flurry et al. | 710/22 |
| 5,944,841 | * | 8/1999 | Christie | 714/38 |
| 6,088,759 | * | 7/2000 | Hasbun et al. | 711/103 |

OTHER PUBLICATIONS

Ramfrez et al, "Software trace cache", ICS ACM pp 119–126, 1999.*

Karplus et al, "Efficient hardware for multi wau jumps and prefetches", ACM pp 11–18, May 1985.*

Moon et al, "hardware implementation of a general multi-way jump mechanism", IEEE, pp 38–45, 1990.*

Netzer et al, "Optimal tracing and incremental reexecution for debugging long running programs", SIGPLAn ACM pp 313–325, 1994.*

Chanramohan et at., "hardware and software support for efficient exception handling", ACM ASPLOS, pp 110–119, Oct. 1994.*

Saraswat et al, "Sematic foundations of concurrent constraint programming", ACM pp 333–352, Aug. 1990.*

Bob Cmelik & David Keppel, "Shade: A Fast Instruction–Set Simulator For Execution Profiling", Sigmetrics 94, May, 1994, Santa Clara USA 1994, pp. 128–137.

"Daisy: Dynamically Architected Instruction–Set From Yorktown", IBM Corporation, 1996, 2 pages.

"Digital FX!132", Digital Semiconductor, 3 pages.

Matt Pietrek, "Learn System—Level Win32 Coding Techniques By Writing A API Spy Program", Systems Journal, Dec. '94, pp. 17–44.

R. Sites, et al., "Binary Translation", Communications Of The ACM, Feb. '93, vol. 36, No. 2, pages 69–81.

Eric Traut, "Core Building The Virtual PC", Byte, Nob. '97, pp. 51–52.

Harry J. Saal & Zui Weiss, "A Software High Performance APL Interpreter", IEIE–IEIE, vol. 9, Issue 4, 1979, pp. 74–81.

Ronald L. Johnston, "The Dynamic Incremental Compiler Of APL/3000", IEIE–IEIE, vol. 9, Issue 4, 1979, pp. 82–87.

Kemal Ebcioglu & Erik R. Altman, "DAISY: Dynamic Compilation For 100% Architectural Compatibility", IBM Research Report, RC 20538, Aug. 5, 1996, Computer Science, pp. 1–82.

Reed Hastings & Bob Joyce (Pure Software, Inc.), "Purify: Fast Detection Of Memory Leaks And Access Errors", USENIX—Winter '92, pp. 125–136.

"PA–RISC Instruction Set Architecture" processor by Hewlett–Packard Company.

* cited by examiner

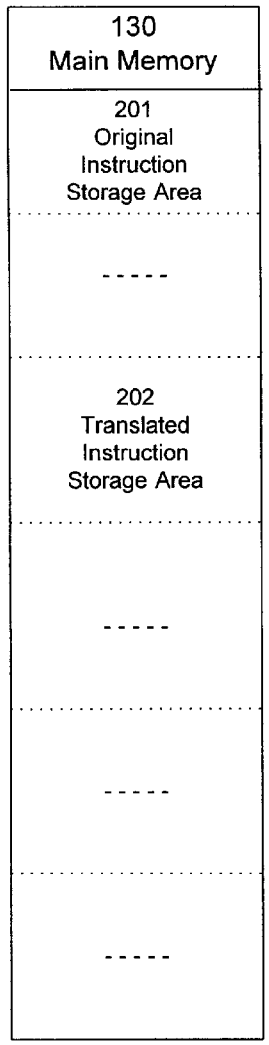
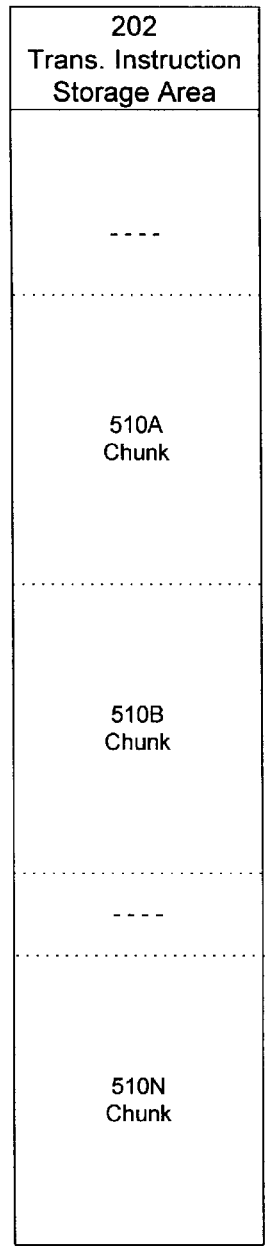
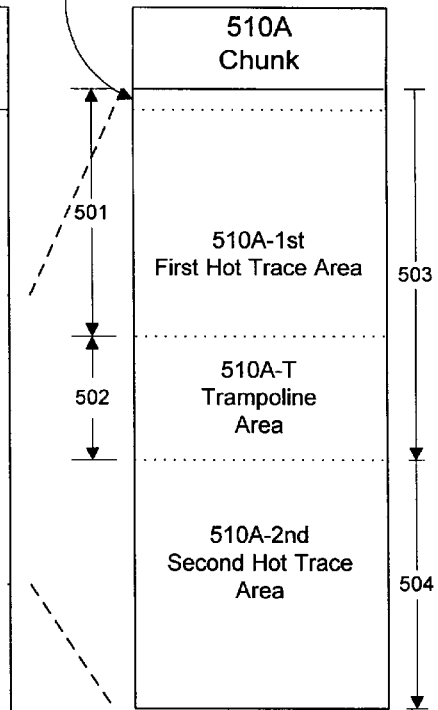
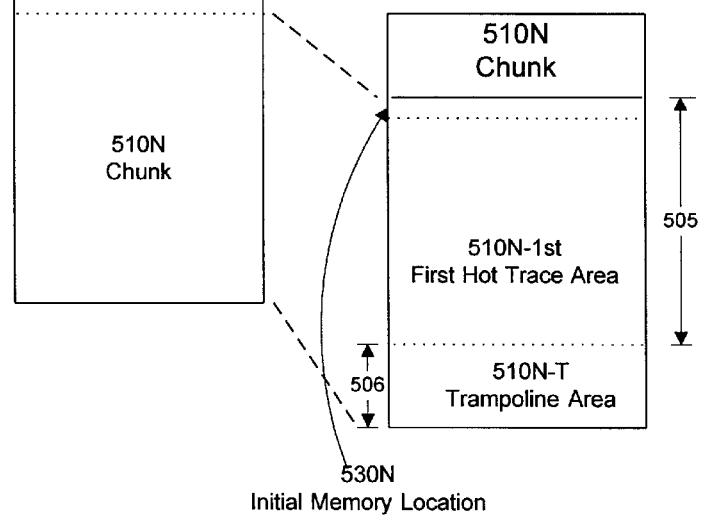

SYSTEM, METHOD, AND PRODUCT FOR MEMORY MANAGEMENT IN A DYNAMIC TRANSLATOR

RELATED APPLICATIONS

The following applications are related to the present application and their disclosures are incorporated by reference as specified in the present specification.

U.S. Patent Application entitled "SYSTEM, METHOD, AND PRODUCT FOR JUMP-EVALUATED TRACE DESIGNATION," attorney docket number 10971492-1, naming as inventors Lacky V. Shah, James S. Mattson, Jr., and William B. Buzbee, assigned to the assignee of the present invention, and filed on May 4, 1998.

U.S. Patent Application entitled "SYSTEM, METHOD, AND PRODUCT FOR CONTROL-PATH-EVALUATED TRACE DESIGNATION," attorney docket number 10971147-1, naming as inventors, Manuel E. Benitez, James S. Mattson, Jr., William B. Buzbee, and Lacky V. Shah, assigned to the assignee of the present invention, and filed on May 4, 1998.

BACKGROUND OF THE INVENTION

1. Field of the Invention

The invention generally relates to computer systems or computer-implemented systems employing translating or optimizing compilers and methods, and, more particularly, to dynamic translating compilers and methods.

2. Related Art

A variety of techniques are known for static translation of the executable instructions of a computer software program. Such known techniques are implemented by static compilers, i.e., compilers that translate a program prior to execution. One disadvantage of such techniques is that the dynamic behavior of a program typically is more readily and accurately ascertained while it is being executed than while it is being compiled prior to execution. The term "dynamic behavior" in this context generally refers to the flow of control through a computer program as it is being executed.

Some systems and methods exist that avoid this disadvantage by a process generally referred to as dynamic translation. That is, a dynamic compiler operates upon an executable image of the original software program as it is being executed at run time. Typically, the dynamic compiler is thus better able to deduce those paths that execution is most likely to take through particular portions of the program (that is, the control flow through the instructions of the program).

Such known dynamic translation systems may be designed to accomplish one or more of a number of tasks. One task is referred to as cross-platform translation, in which a program designed and written for execution on a computer system having a particular architecture and operating system is translated so that the translated program may be executed on another type of computer system. Some existing dynamic translation systems include "Daisy" by International Business Machine Corporation, "fx!32" from Digital Equipment Corporation, and "Wabi" from Sun Microsystems.

Dynamic translation systems are also used for instrumentation and profiling of programs without the need for recompilation. The term "instrumentation" refers generally to the insertion of special code to detect or record various parameters of execution, and "profiling" refers generally to reporting such parameters. Such use may also be referred to as "monitoring." Examples of existing products intended for such uses include "Shade" from Sun Microsystems and "ATOM" from Digital Equipment Corporation.

Such tasks of dynamic translation systems generally are also undertaken by static translation systems, albeit with the noted disadvantage. However, another task traditionally carried out by static translation systems is not adequately carried out by known dynamic translation systems. Such task is optimization; that is, the alteration, deletion, rearrangement, or other revision of instructions, or the addition of new instructions, with the specific objectives of increasing the speed of execution of executable instructions, decreasing the amount of computer resources needed for such execution, or both. Therefore, what is needed is a system, method, and product for increasing the opportunities for, and efficiencies of, dynamic optimization of executable instructions. More generally, what is needed is a system, method, and product for increasing the efficiencies of dynamic translation systems irrespective of their purpose.

SUMMARY OF THE INVENTION

The present invention is a system, method, and product for improving the speed of dynamic translation systems by efficiently positioning translated instructions in a computer memory unit. The verb "position," and its grammatical variants, may refer herein to placement, moving, replication, replacement, or similar actions. Also, as used herein, the term "instruction" refers broadly to a computer instruction word or words that may specify an operation, such as jump, add, compare, another operation, or any combination thereof; may specify an address; or may perform another of a variety of known functions. Generally, one instruction occupies one memory location in the computer memory unit, and each memory location contains only one instruction. Optionally, such translated instructions may also be dynamically instrumented, dynamically optimized, and/or otherwise processed for any purpose now implemented by the use of translated instructions or other such purposes to be developed in the future. The terms "dynamically instrumented," "dynamically optimized," and their grammatical variants, refer respectively herein to the application of any of a variety of instrumentation and optimization techniques, now known or to be developed in the future, to instructions or groups of instructions at run time.

More specifically, the speed of execution of dynamically translated instructions, which is a factor of particular relevance to dynamic optimization systems, may be adversely affected by inefficient jumping between various sections of the translated instructions. The present invention reduces the slowing effect of such inefficient jumping by efficiently positioning the sections of translated instructions with respect to each other and with respect to specialized instructions (referred to herein as "trampoline instructions") that redirect control flow from the translated instructions.

In one embodiment of the invention, a method for positioning translated traces and their trampoline instructions in a computer memory unit is disclosed. The term "translated trace" is used herein to refer to any group of one or more translated instructions having a common control path. A translated trace may be, but is not necessarily, a "hot trace." The term "hot trace" is used herein to refer to a group of translated instructions through which control frequently passes, or, in some embodiments, has passed more than a predetermined number of times. That is, the term "hot" signifies that the common control path through the group of instructions of the trace is frequently executed. For convenience, the term "frequent," and its grammatical variants, are used herein to refer both to control passing through instructions either at a rate, or for a number of times, greater than a threshold value.

It typically is advantageous to translate hot traces of original instructions, particularly with respect to a dynamic optimization system, because such selective optimization increases the likelihood that the time saved by translation (and optimization) generally will be greater than the time spent translating (and optimizing) instructions and positioning them efficiently in memory. This result is due to the fact that, once translated, translated instructions typically are available for execution without the need to repeat the translation process. Thus, assuming the translated (and typically optimized) instructions execute faster than the original instructions from which they were translated, the more frequently a translated group of instructions is executed, the greater the time savings achieved. Alternatively stated, if a trace of instructions is translated that is not frequently executed, the likelihood increases that the time spent in such translation may exceed the time saved by infrequently executing the translated trace.

In applications of dynamic translation systems in which purposes other than, or in addition to, optimization are implemented, it may be desirable to translate all instructions, or instructions in addition to those that are frequently executed. For convenience, embodiments of the invention are described herein generally with respect to the translation of hot traces in the context of dynamic optimization. However, it will be understood that the invention is not so limited. In particular, the term "hot trace" as used herein with respect to the description of some embodiments may, in alternative embodiments, be replaced by the broader term "translated trace." For example, in the context of a dynamic translation system used for cross-platform translation, all instructions in the original executable file may be translated as they are executed or otherwise, and thus the translated instructions operated upon by the invention typically include translated traces that need not be hot traces. The term "executable file" is used broadly herein to include groups of one or more original instructions that may be executed, whether or not included in a "file" as that term commonly is used with respect to the relevant art. For example, original, executable, instructions may be downloaded over a network and then executed. In one such exemplary implementation, those instructions could be part of a code segment, such as a so-called "applet."

The terms "trampoline instructions" or "trampoline-instruction set" are used herein to refer to one or more instructions that are generated to serve as the temporary destination of control flow out of a particular exit from a translated trace. The trampoline instructions redirect control flow to one of various destinations based on the design of the dynamic translation system and the dynamic status of the execution of the computer program. For example, trampoline instructions may redirect control flow so that an exit from a translated trace that would otherwise lead to an original instruction of the file being executed would instead be directed to a translation of such original instruction. Alternatively, the trampoline instructions may redirect such control flow to an instruction emulator. Thus, the trampoline instructions are so-named because they bounce control from a translated trace to a destination that may be determined based on the dynamic behavior of the computer program rather than on the statically compiled original instructions of the program.

A translated trace typically is made up of one or more "instruction blocks," which are groups of original instructions of an executable file. An instruction block typically is made up of one or more "basic blocks," each of which is a sequence of original instructions of an executable file. Each of the original instructions of a basic block may be reached through a common control path. That is, there is only one entrance into, and one exit out of, a basic block. The entrance is the first instruction in the sequence, and the exit is the last instruction in the sequence. A basic block may consist of a single instruction.

As the term is illustratively used herein, an instruction block also has one exit instruction through which control passes out of the block, which is the last instruction in the block. However, control may enter an instruction block through more than one instruction of the block. That is, because an instruction block may include more than one basic block, and control may pass to the first instruction of a basic block from an instruction that is not included in the same instruction block, there are potentially more than one control paths into an instruction block.

A control path from one instruction block to another instruction block is referred to herein as an "arc." The action of transferring control over an arc, other than by an unconditional fall-through, is referred to as a "jump." An unconditional fall-through is the unconditional passing of control from a first instruction to the instruction immediately following such first instruction. An instruction, or group of associated instructions, that causes a jump to occur is referred to herein as a "jump instruction." As illustratively provided herein, the last instruction in a basic block or an instruction block is a jump instruction, and such jump instruction is the only jump instruction in the basic block or instruction block. An "indirect jump" is a jump to a register or memory location that contains the address of the target instruction of the jump. A "direct jump" is a jump to the address of the target instruction of the jump. The instruction to which a jump is directed is referred to herein as a target instruction.

In some embodiments, the present invention is applied to translated traces externally provided by the dynamic translation system. In alternative embodiments, a trace translator of the present invention may generate the translated traces. Whether externally provided or internally generated in accordance with the invention, translated traces described with respect to the present invention typically include "trampoline-link instructions." The purpose of providing trampoline-link instructions is to cause control to flow out of particular exits from the translated trace to corresponding trampoline-instruction sets rather than to the original instruction targets of those exits. The term "corresponding" in this context means that control from a particular exit from a translated trace typically is directed to a particular trampoline-instruction set. More specifically, control flows from a trampoline-link instruction in a translated trace to a "target trampoline instruction" of the corresponding trampoline set. In one implementation, each such exit from a trampoline-link instruction corresponds to a unique trampoline-instruction set. In one implementation of the present invention, the trampoline-instruction sets are externally provided by the dynamic translation system. In alternative embodiments, the trampoline-instruction sets (and/or the translated traces, as noted) may be generated by the present invention.

In a first embodiment, a method of the present invention includes: (1) designating a portion of the computer's memory unit as a storage area for translated instructions and corresponding trampoline-instruction sets, such storage area being figuratively divided (i.e., identified for purposes of employing the method rather than physically, electronically, or otherwise operationally divided) into one or more "chunks" of memory locations, and (2) positioning a number of translated traces and corresponding trampoline-instruction sets into a chunk. Each chunk typically includes a group of memory locations, and the "length" of a chunk is intended herein to refer to the number of memory locations in such group. A chunk thus typically may be defined herein in terms of its "initial memory location" and its length. Typically, the memory locations of a chunk are contiguous, but it need not be so in all embodiments. For example, a portion of a chunk may include patching instructions that patch such portion to one or more other, non-contiguous, portions of the chunk.

The term "initial memory location" means a memory location from which control would pass to all other memory locations of the chunk if all such locations were occupied by instructions having unconditional fall-through arcs. That is, if no jump instructions were included in the chunk, and control entered the instruction located at the initial memory location of the chunk, control would pass sequentially through all memory locations of the chunk. As illustrated herein, a chunk is generally assumed to be a sequential and contiguous set of memory locations, although it need not be so in alternative embodiments.

The chunk length, in accordance with such first embodiment, is based on a "machine-specific shortest jump distance." For example, as will be evident to those skilled in the relevant art, the size of instruction words and other aspects of the computer architecture may be such that a direct conditional jump only may be executed if the distance between the conditional jump instruction and its target instruction is not more than a certain number of bytes. This jump distance is limited in certain computer architectures because the length of the instruction words constrains the number of addresses relative to the present address that can be specified in a single instruction word. Thus, if a translated trace includes such a jump instruction, the target instruction generally is excluded from being located at a distance from the jump instruction that is greater than the most distant address that can be represented within the instruction word. Other types of jump instructions may impose other distance limitations, and some kinds of jump instructions (such as an indirect jump) may impose no jump distance limitation.

Generally, the term "machine-specific shortest jump distance" is used herein to refer to the shortest of the jump distances to which various types of jump instruction may be constrained, provided that a jump instruction having such shortest jump distance is of a type that may be included in a translated trace located in the chunk. For example, a first type of jump instruction may be constrained to jumps of no greater than 2,048 memory locations and a second type may be constrained to jumps of no greater than 16,384 memory locations. If both types of jump instructions are positioned, or, in some embodiments, may be positioned, in a chunk, then the machine-specific shortest jump distance is 2,048. The term "worst-case jump" is used herein to refer to an instance in which a jump instruction of a type having the machine-specific shortest jump distance is positioned in a chunk such that the distance between it and its target trampoline instruction is the greatest possible distance between instructions in the chunk.

In some embodiments, there may also be a plurality of machine-specific shortest jump distances, each applicable to one or more chunks, with each chunk having only one applicable machine-specific shortest jump distance. For example, a jump instruction that is of the first or second type of jump instruction may be positioned in certain chunks having the machine-specific shortest jump distance of the illustrative first type of jump instruction (maximum jump distance of 2,048 memory locations). A jump instruction that is of the second type of jump instruction (16,384 memory locations) may be positioned in certain chunks having the machine-specific shortest jump distance of the second type of jump instruction. A jump instruction that is of the first type of jump instruction, however, generally is not positioned in a chunk having the machine-specific shortest jump distance of the second type of jump instruction. The reason is that this jump instruction of the first type might not be able to reach a target translated instruction, even if the target is positioned in the same chunk.

As is well known by those skilled in the relevant art, changes may be made to a jump instruction and/or its target instruction to allow a jump to be made that, in effect, is greater than the jump distance to which such jump instruction nominally is constrained. However, such extension of the jump distance generally is achieved at the expense of requiring additional machine cycles for execution. That is, placing a jump instruction and its target instruction in memory locations located at a distance greater than the nominal jump distance for that type of jump instruction generally slows down the execution of the translated instructions. The time spent in executing a jump is referred to herein as "jump overhead." Thus, "efficient" positioning of translated instructions and corresponding trampoline instructions is achieved by maintaining a low jump overhead. A first translated trace therefore may be relatively efficiently or inefficiently positioned with respect to a second translated trace depending on the distance between the traces in memory and the machine-specific shortest jump distance.

In the first embodiment, the chunk length is determined so that, for every translated trace and trampoline-instruction set positioned in the same chunk, the greatest distance between a trampoline-link instruction and its target trampoline instruction is not greater than the machine-specific shortest jump distance for that type of trampoline-link instruction. In a first implementation of the first embodiment, it is assumed that any translated trace may include one or more of the type of trampoline-link instruction having the shortest allowable jump distance of any type of trampoline-link instruction that may appear in the original executable file. The machine-specific shortest jump distance is thus equal to this shortest allowable jump distance. Under this assumption, the chunk length may include any one of several values. In one aspect, the chunk length is not greater than the machine-specific shortest jump distance. Thus, even if a first translated trace and its corresponding trampoline-instruction set are positioned at opposite ends of the same chunk, it is provided that all trampoline-link instructions in the first translated trace, including those of a type having the machine-specific shortest jump distance, are within an allowable distance from their target trampoline instruction. As is evident, it also is provided that the remaining memory locations of the chunk may be occupied by other translated traces and their trampoline-instruction sets such that no jump between the translated traces and their trampoline-instruction sets, or between the translated traces directly, exceeds such machine-specific shortest jump distance.

In another aspect, the chunk length is not greater than twice the machine-specific shortest jump distance. For example, the chunk may include a "top" area for storing translated traces, a bottom area for storing additional translated traces, and a "middle" area for storing trampoline-instruction sets for both the top and bottom translated-trace storage areas. Generally, the most efficient configuration is that of the top and bottom areas being of equal length. Otherwise, the shorter of such areas could have been made longer under the assumption that the length of the chunk is determined so that a worst-case jump may be executed between any trace in either the top or bottom areas and the trampoline-instruction sets in the middle area. It generally is desirable that the top and bottom areas be as long as possible, because a larger number of translated traces can be packed more closely together and jumps between them are less likely to impose high jump overhead. Thus, the most efficient configuration generally is of equal lengths of the top and bottom areas.

If there were no middle area, then such a configuration generally would yield top and bottom areas both having a length equal to the machine-specific shortest jump distance, thus resulting in a chunk length of twice such distance. Because the middle area generally has a positive, non-zero, length, the sizes of the top and bottom areas are each reduced by half of the length of the middle area, assuming that the trampoline instructions for the traces in the top and bottom areas are stored in the top and bottom halves of the middle area, respectively. Under such a configuration, it is provided that every trampoline-link instruction positioned either in the top or bottom storage areas may pass control to its target trampoline instruction positioned in the middle area, even if the target trampoline instruction is at the most extreme possible distance from the trampoline-link instruction. Other configurations are possible in other embodiments; for example, by determining whether the top or bottom storage areas may be expanded into portions of the middle area not occupied by their respective trampoline instructions.

As will be understood by those skilled in the relevant art, the relative terms "top," "bottom," and "middle" are illustratively used in this context to refer to positions in memory relative to the flow of control under an assumption of unconditional fall-through. That is, it is illustratively assumed that, if control enters at a top instruction of the chunk, and control falls through, rather than jumps, then the next-top-most instruction will be executed, and so on through the middle instructions and then the bottom ones. Typically, a top memory location of a chunk has a smaller value as its address than has a memory location not located as near to the top of the chunk. It will be understood by those skilled in the relevant art that such relative terms and assumptions regarding memory-location values are provided for clarity and convenience only. There are many ways to direct control through instructions to implement a fall-through condition, and any of such techniques, or others to be developed in the future, may be applied in alternative embodiments.

In other embodiments, the chunk length may be determined to be at least as great as the machine-specific shortest jump distance, provided that no trampoline-link instruction of any translated trace is at a greater distance from its target trampoline instruction than the machine-specific shortest jump distance. Such a chunk may then include, in one implementation, a top area for storing translated traces and a bottom area for storing the corresponding trampoline-instruction sets, or vice versa. By imposing such a constraint and positioning of instructions, it generally is provided that as many translated traces as possible may be stored in the chunk. That is, an overly conservative condition is not maintained whereby translated traces that could have been positioned near to each other in the same chunk are positioned in different chunks separated at least by the length of intervening areas for the storage of trampoline-instruction sets.

The present invention includes in some embodiments a backpatcher that backpatches jump instructions in one translated trace so that they jump to a target instruction in another translated trace rather than to the corresponding target trampoline instruction. The term "backpatch," and its grammatical variants, will be understood by those skilled in the relevant art to refer to the replacement, typically by overwriting, of one or more executable instructions by new executable instructions. Typically, the function of backpatching is to redirect a jump instruction so that it transfers control to a new target instruction. With respect to the present invention, such new target instruction typically is the first-executed in a group of instructions that are a translated version (i. e., a translated trace) of the instructions to which the backpatched jump instruction passed control via the corresponding trampoline instruction set.

Such backpatching typically renders the corresponding trampoline instruction set for the backpatched jump instruction unreachable by any control path (such unreachable instructions commonly are referred to as "dead code"). Thus, in some embodiments, the backpatcher may eliminate the unreachable trampoline instruction set so that the memory locations it occupied may be used for storage of other trampoline instruction sets, for expansion of the translated trace storage areas, or for other purposes. The term "eliminate" is used in this context, and with respect to the elimination of hot traces as described below, to refer to any of a variety of known techniques for making memory locations available and suitable for the storage of new information. One such technique is to change a map of memory locations (not shown) to indicate that certain memory locations are available, thus making them available to be overwritten by new data. Such technique may, but generally need not, be accompanied by the resetting of the contents of such memory locations to a default, or null, value.

The present invention may also include a translated-instruction-storage-area manager, a chunk manager, a trace manager, a trampoline manager, or any combination thereof. The translated-instruction-storage-area manager determines how much space to allocate in the computer memory unit for the storage of translated traces and their corresponding trampoline instruction sets. Such allocated space is referred to herein as the "translated instruction storage area." The translated-instruction-storage-area manager may also determine either uniform or variable chunk lengths so that the translated instruction storage area may be figuratively divided into chunks. The chunk manager determines which chunk is used to store a newly translated trace. In some implementations, such determination is made by preferentially storing the newly translated trace in a chunk that already contains another trace that may pass control to it, or receive control from it. In some aspects, if there is insufficient space in any chunk to accommodate the newly translated trace, the chunk manager may delete one or more translated traces in a chunk in order to make room for the newly translated chunk. The chunk manager may select the traces to be deleted by a first-in-first-out (FIFO) scheme. In alternative implementations, the chunk manager may select a trace for deletion that is closest to the portion of the chunk in which trampoline instructions are stored, or in accordance with other criteria. In further aspects, if a trace is too long to fit in an empty chunk, the chunk manager may employ known techniques to provide that such a trace is stored in a portion of memory that is not necessarily within the translated instruction storage area. The trace manager and trampoline manager position translated traces, and trampoline instructions, respectively, in chunks.

In one embodiment, the invention is a memory manager for use in cooperation with a computer system. The computer system includes a memory unit in which are stored original instructions of an executable file, translated traces, and corresponding trampoline-instruction set. The memory manager includes a translated-instruction storage-area manager that determines a first chunk length of a first chunk of the memory unit based on a first of one or more machine-specific shortest jump distances. The memory manager also includes a trace manager that positions within the first chunk a first translated trace including a first trampoline-link instruction of a type of jump instruction having a first machine-specific shortest jump distance. The trace manager also positions within the first chunk a first trampoline-instruction set having a first target trampoline instruction that may receive control from the first trampoline-link instruction. A first distance from the positioned first trampoline-link instruction to the positioned first trampoline target instruction is not greater than the first machine-specific shortest jump distance. In one aspect of this embodiment, the first machine-specific shortest jump distance is the shortest distance of any of the one or more machine-specific shortest jump distances.

In one implementation of this embodiment, each trampoline-instruction set includes one or more target trampoline instructions, and each of the translated traces includes one or more trampoline-link instructions that each may cause control to pass to a corresponding one of the target trampoline instructions. The translated-instruction storage-area manager determines the first chunk length to be the same as a longest of any distance from any trampoline-link instruction positioned in the first chunk to its corresponding target trampoline instruction positioned in the first chunk, wherein the longest distance is not longer than the machine-specific shortest jump distance.

The translated-instruction storage-area manager may determine the first chunk length to be no greater than the first machine-specific shortest jump distance. Alternatively, the translated-instruction storage-area manager may determine that the first chunk length be no greater than twice the first machine-specific shortest jump distance, or at least as great as the first machine-specific shortest jump distance.

In one embodiment, the translated-instruction storage-area manager designates within the first chunk a first translated trace area A that has contiguous first area A memory locations, and also designates within the first chunk a first trampoline area that has contiguous first trampoline area memory locations. The trace manager positions the first translated trace in the first translated trace area A, and positions the first trampoline-instruction set in the first trampoline area. In one implementation, the first translated trace area A and the first trampoline area are contiguous with respect to each other. Also, in some aspects, the first machine-specific shortest jump distance is not greater than a sum of a first area A maximum distance and a first trampoline area maximum distance, wherein the first area A maximum distance is equal to a first longest distance between any two of the plurality of contiguous first area A memory locations, and the first trampoline area maximum distance is equal to a second longest distance between any two of the plurality of contiguous first trampoline area memory locations.

In a further implementation of this embodiment, the translated-instruction storage-area manager designates within the first chunk a first translated trace area B having contiguous first area B memory locations, wherein none of the first area B memory locations are the same as any of the first area A memory locations, and further wherein the first translated trace area B and the first trampoline area are contiguous with respect to each other. In one aspect of this implementation, the first machine-specific shortest jump distance is not greater than a sum of a first area B maximum distance and the first trampoline area maximum distance, wherein the first area B maximum distance is equal to a third longest distance between any two of the plurality of contiguous first area B memory locations. Also, the trace manager may, after positioning the first translated trace, position a second translated trace having a first number of translated instructions occupying the first number of memory locations. The second translated trace is positioned in first translated trace area A when a second number of first area A memory locations not occupied by the first translated trace and any other of the plurality of translated traces is not less than the first number, and the second translated trace is positioned in first translated trace area B when the second number is less than the first number.

In a further embodiment of the memory manager, the translated-instruction storage-area manager determines chunks of the computer memory unit, each having one of a plurality of chunk lengths based on one or more machine-specific shortest jump distances. The translated-instruction storage-area manager also determines within each of the plurality of chunks at least one translated trace area for positioning one or more of the translated traces, and determines within each of the plurality of chunks at least one trampoline area for positioning of one or more of the trampoline-instruction sets. In this embodiment, the trace manager further positions within a first translated trace area one or more translated traces including a first translated trace, each having at least one trampoline-link instruction. After positioning the one or more translated traces, the trace manager positions within a second translated trace area a second translated trace having a first number of translated instructions occupying the first number of memory locations. The second translated trace area preferentially is determined to be the first translated trace area when at least one of the one or more translated traces includes at least one external jump instruction translated from an original instruction that may pass control to an original target instruction from which a first instruction of the first number of translated instructions is translated. In one implementation, the second translated trace area is determined not to be the first translated trace area when a second number of memory locations not occupied by any of the one or more translated traces in the first translated trace area is less than the first number. In one implementation, the trace manager eliminates a group of at least one of the one or more translated traces, wherein the group occupies a third number of memory locations equal to or greater than the first number less the second number, when a second number of memory locations not occupied by any of the one or more translated traces in the first translated trace area is less than the first number.

In another implementation, the memory manager also includes a backpatcher. When at least one of the one or more translated traces includes a first external jump instruction translated from an original instruction that may pass control to a first original target instruction from which a first translated instruction of the first number of translated instructions is translated, the backpatcher backpatches the first external jump instruction to pass control to the first translated instruction. The backpatcher may backpatch the first external jump instruction to pass control directly to the first translated instruction.

In another implementation, the trace manager further positions within a first translated trace area one or more translated traces including a first translated trace, each having at least one trampoline-link instruction. After positioning the one or more translated traces, the trace manager positions within a second translated trace area a second translated trace including a first translated target instruction that is translated from a first original target instruction. It also positions within a first trampoline area in the same chunk as the first translated trace a first trampoline-instruction set having a first plurality of trampoline instructions including a first target trampoline instruction that may receive control from the first trampoline-link instruction. A first distance from the positioned first trampoline-link instruction to the positioned first trampoline target instruction is not greater than the first machine-specific shortest jump distance. Also in this implementation, when the first translated trace includes a first external jump instruction translated from an original instruction that may pass control to the first original target instruction, wherein the first external jump instruction has a first machine-specific shortest jump distance, and when the distance from the first external jump instruction to the first translated target instruction is greater than the first machine-specific shortest jump distance, the backpatcher backpatches the first external jump instruction to pass control indirectly to the first translated instruction through the first trampoline target instruction using an indirect address included in one or more of the first plurality of trampoline instructions.

In a further embodiment, the translated-instruction storage-area manager determines the first chunk length based on a default ratio between a default translated trace-area length and a default trampoline-area length. The default ratio may be user-adjustable. In another embodiment, the translated-instruction storage-area manager further determines a length of the first trampoline area by dynamic updating.

BRIEF DESCRIPTION OF THE DRAWINGS

The above and further advantages of the invention will be more clearly appreciated from the following detailed description when taken in conjunction with the accompanying drawings, in which like reference numerals indicate like structures or method steps, in which the leftmost one digit of a reference numeral indicate the number of the figure in which the referenced element first appears (for example, the element 210 appears first in FIG. 2), solid lines generally indicate control flow, dotted lines generally indicate data flow, and wherein:

FIG. 5A is a schematic representation of portions of the main memory of the computer system of FIG. 1, including an original instruction storage area and a translated instruction storage area;

FIG. 5B is a more detailed schematic representation of one embodiment of the figurative division of the translated instruction storage area of FIG. 5A into chunks of memory locations;

FIG. 5C is a more detailed schematic representation of one embodiment of one of the exemplary chunks of FIG. 5B in which such chunk is figuratively divided into first and second storage areas for storing hot traces and, between such storage areas, an area for storing trampoline-instruction sets corresponding to such hot traces;

FIG. 5D is a more detailed schematic representation of one embodiment of a second of the exemplary chunks of FIG. 5B in which such chunk is figuratively divided into one storage areas for storing hot traces and an area for storing trampoline-instruction sets corresponding to such hot traces.

DETAILED DESCRIPTION

Figure 1:
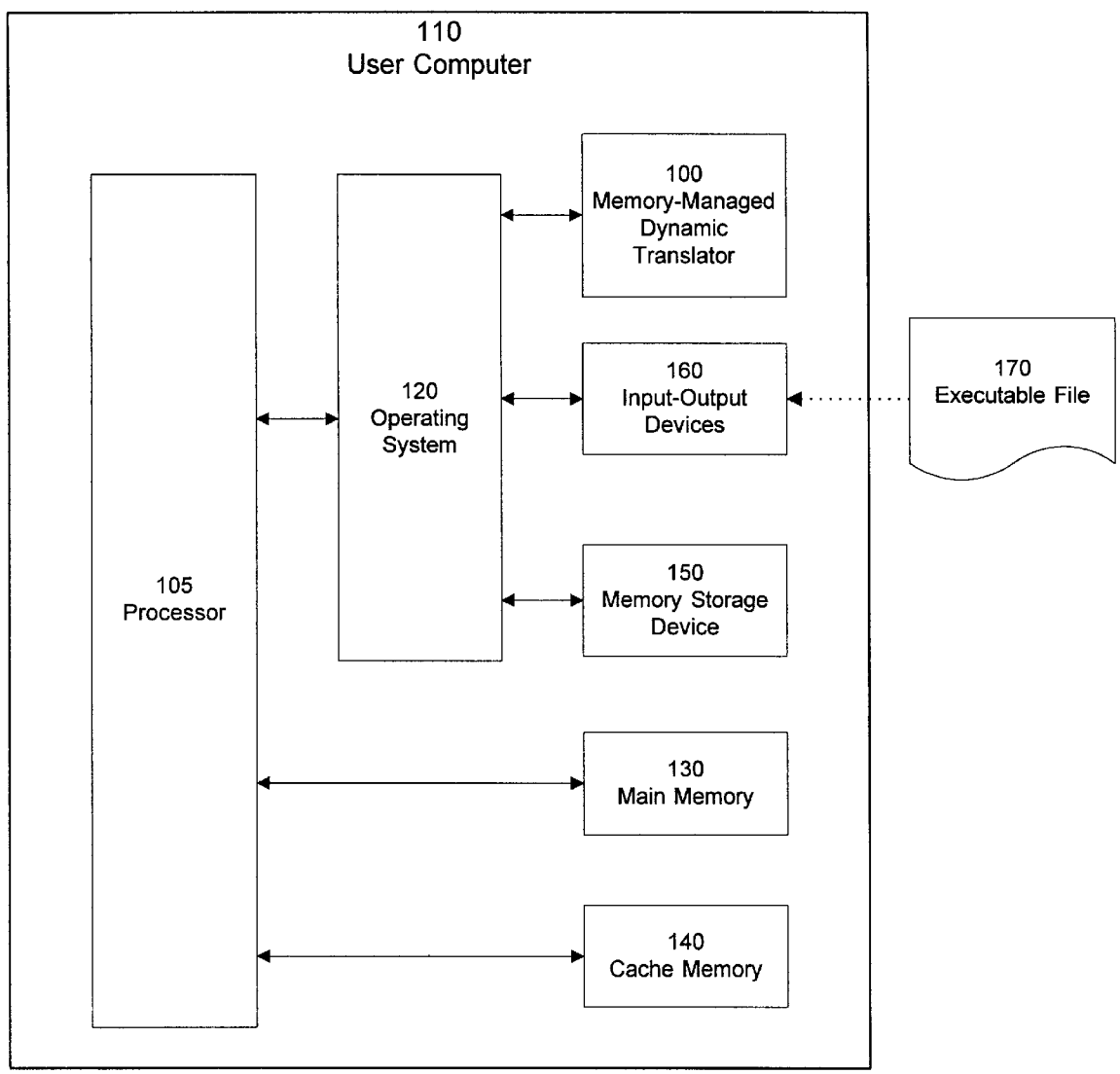
FIG. 1 is a functional block diagram of one embodiment of a computer system on which one embodiment of the memory-managed dynamic translator of the present invention is implemented.

The attributes of the present invention and its underlying method and architecture will now be described in greater detail with reference to one embodiment of the invention, referred to as memory manager 220. Memory manager 220, in the illustrated embodiment, operates as an element of memory-managed dynamic translator 100, or simply translator 100, aspects of which are illustrated in FIGS. 1 through 6. References are made in this detailed description to various terms that are described in the Summary above.

Various functional elements of the present invention are described that may be implemented either in software, hardware, firmware, or any combination thereof. For convenience of illustration, descriptions generally are made with respect to implementations in software. Such descriptions therefore typically refer to software-implemented functional elements that will be understood to comprise sets of software instructions that cause described functions to be performed. Similarly, in a software implementation, memory manager 220 may be referred to as "a set of memory-management instructions for a dynamic translator."

It will be understood by those skilled in the relevant art that the functions ascribed to memory manager 220, or any of its functional elements, typically are performed by the central processing unit (CPU) of the computer system executing such software instructions, typically in cooperation with the operating system of the computer system. More generally, it will be understood that functions performed by the invention, whether implemented in software, hardware, firmware, or any combination thereof, typically are performed by the CPU in cooperation with the operating system, or by a special purpose processor. Henceforth, the fact of such cooperation among the CPU and operating system (or a special purpose processor), and the elements of the invention, whether implemented in software, hardware, firmware, or any combination thereof, may therefore not be repeated or further described, but will be understood to be implied. In particular, the cooperative functions of the operating system, which are well known to those skilled in the relevant art, may be omitted for clarity.

It will also be understood by those skilled in the relevant art that the functions ascribed to memory manager 220 and its functional elements, whether implemented in software, hardware, firmware, or any combination thereof, may in some embodiments be included in the functions of the operating system. That is, for example, operating system 120 may include memory manager 220. In such embodiments, the functions of memory manager 220 may be described with reference to the execution by the CPU of a set of memory management instructions, but without reference to cooperation with a separate operating system. In such embodiments, the functions ascribed to memory manager 220, or any of its functional elements, typically are performed by the CPU executing such software instructions in cooperation with aspects of operating system 120 other than memory manager 220. Therefore, in such embodiments, cooperation by memory manager 220 with aspects of an operating system may not be stated, but will be understood to be implied.

The computer system that implements the present invention is referred to herein as the "user computer." It will be understood, however, that such term is intended to include any type of computing platform, whether or not operated by a user.

USER COMPUTER 110

FIG. 1 is a simplified functional block diagram of one exemplary embodiment of a computer system, referred to as user computer 110, on which translator 100, including memory manager 220, is implemented. User computer 110 may be a personal computer, network server, workstation, or other computer platform now or later developed. User computer 110 may also be a device specially designed and configured to support and execute the functions of memory manager 220 as described below. User computer 110 includes known components including processor 105, operating system 120, main memory 130, cache memory 140, memory storage device 150, and input-output devices 160. It will be understood by those skilled in the relevant art that there are many possible configurations of the components of user computer 110 and that some components that may typically be included in user computer 110 are not shown, such as a video card, data backup unit, and many other devices.

Processor 105 may be a commercially available processor such as a PA-RISC processor made by Hewlett-Packard Company, a SPARC® processor made by Sun Microsystems, a 68000 series microprocessor made by Motorola, an Alpha processor made by Digital Equipment Corporation, or it may be one of other processors that are or will become available. In one preferred aspect of the present embodiment, processor 105 is a PA-8000 RISC processor made by Hewlett-Packard Company.

Processor 105 executes operating system 120, which may be, for example, one of the DOS, Windows 3.1, Windows for Work Groups, Windows 95, Windows 98, or Windows NT operating systems from the Microsoft Corporation, the System 7 or System 8 operating system from Apple Computer, the Solaris operating system from Sun Microsystems, a Unix®-type operating system available from many vendors such as Sun Microsystems, Inc., Hewlett Packard, or AT&T, the freeware version of Unix® known as Linux, the NetWare operating system available from Novell, Inc., or some combination thereof, or another or a future operating system. In one aspect of the illustrated embodiment, operating system 120 is the HPUX version of the Unix® operating system made by Hewlett-Packard Company. Operating system 120 interfaces with firmware and hardware in a well-known manner, and facilitates processor 105 in coordinating and executing the functions of the other components of user computer 110.

Main memory 130 may be any of a variety of known memory storage devices or future memory devices, including, for example, any commonly available random access memory (RAM), magnetic medium such as a resident hard disk, or other memory storage device. In one aspect of the illustrated embodiment, main memory 130 is made up of dynamic random access memory (DRAM) chips.

Cache memory 140 may similarly be any of a variety of known memory storage devices or future devices, including the examples noted above with respect to main memory 130. In one aspect of the illustrated embodiment, cache memory 150 typically is made up of static random access memory (SRAM) chips. In an alternative embodiment, cache memory 140 may be located on the same chip as processor 105.

Memory storage device 150 may be any of a variety of known or future devices, including a compact disk drive, a tape drive, a removable hard disk drive, or a diskette drive. Such types of memory storage device 150 typically read from, and/or write to, a program storage device (not shown) such as, respectively, a compact disk, magnetic tape, removable hard disk, or floppy diskette. Any such program storage device may be a computer program product. As will be appreciated by those skilled in the relevant art, such program storage devices typically include a computer usable storage medium having stored therein a computer software program and/or data.

Computer software programs, also called computer control logic, typically are stored in main memory 130, cache memory 140, and/or the program storage device used in conjunction with memory storage device 150. Such computer software programs, when executed by processor 105, enable user computer 110 to perform the functions of the present invention as described herein. Accordingly, such computer software programs may be referred to as controllers of user computer 110.

In one embodiment, the present invention is directed to a computer program product comprising a computer usable medium having control logic (computer software program, including program code) stored therein. The control logic, when executed by processor 105, causes processor 105 to perform the functions of the invention as described herein. In another embodiment, the present invention is implemented primarily in hardware using, for example, a hardware state machine. Implementation of the hardware state machine so as to perform the functions described herein will be apparent to those skilled in the relevant arts.

Input devices of input-output devices 160 could include any of a variety of known devices for accepting information from a user, whether a human or a machine, whether local or remote. Such devices include, for example a keyboard, mouse, touch-screen display, touch pad, microphone with a voice recognition device, network card, or modem. Output devices of input-output devices 160 could include any of a variety of known devices for presenting information to a user, whether a human or a machine, whether local or remote. Such devices include, for example, a video monitor, printer, audio speaker with a voice synthesis device, network card, or modem. Input-output devices 160 could also include any of a variety of known removable storage devices, including a CD-ROM drive, a tape drive, a removable hard disk drive, or a diskette drive.

Memory manager 220 could be implemented in the "C" or "C++" programming languages, although it will be understood by those skilled in the relevant art that many other programming languages could be used. Also, as noted, memory manager 220 may be implemented in any combination of software, hardware, or firmware. If implemented in software, memory manager 220 may be loaded into memory storage device 150 through one of input-output devices 160. Memory manager 220 may also reside in a read-only memory or similar device of memory storage device 150, such devices not requiring that memory manager 220 first be loaded through input-output devices 160. It will be understood by those skilled in the relevant art that memory manager 220, translator 100, or portions of either or both, may typically be loaded by processor 105 in a known manner into main memory 130 or cache memory 140 as advantageous for execution.

Executable file 170 may be any of a variety of known executable files or an executable file of a type to be developed in the future. Examples of such known files are those having an extension of ".exe" operating under a DOS or Windows operating system or an "a.out" file of a Unix®-type operating system. Executable file 170 may typically be loaded through an input device of input-output devices 160, such as a diskette drive, and a copy of it placed by processor 105 into memory storage device 150 or main memory 130. A copy of executable file 170, or portions of it, (hereafter, simply referred to as executable file 170) may alternatively be placed by processor 105 into cache memory 140 for speedier execution.

Speedier execution is generally possible by placing the instructions being executed, and the data being used or generated by such execution, into cache memory 140. As stated above, cache memory 140 may be made up of SRAM chips or may be located on the same chip as the processor. Information stored in cache memory is typically one or two orders of magnitude faster to access and use than information contained in the DRAM chips of which main memory 130 typically is made. Information stored in memory storage device 150 typically is much slower to access and use than information in either SRAM or DRAM chips. Thus, while information may conveniently be stored in memory storage device 150 for later execution, execution typically takes place with respect to instructions and data stored either in main memory 130 or cache memory 140. In the illustrated embodiment, it will be assumed for clarity that operating system 120 causes processor 105 to place the instructions and data of executable file 170, constituting what are referred to herein as "original instructions," in main memory 130 for execution. The portion of main memory 130 in which such original instructions are stored is schematically represented in FIG. 2 as original instruction storage area 201.

MEMORY-MANAGED DYNAMIC TRANSLATOR 100

Figure 2:
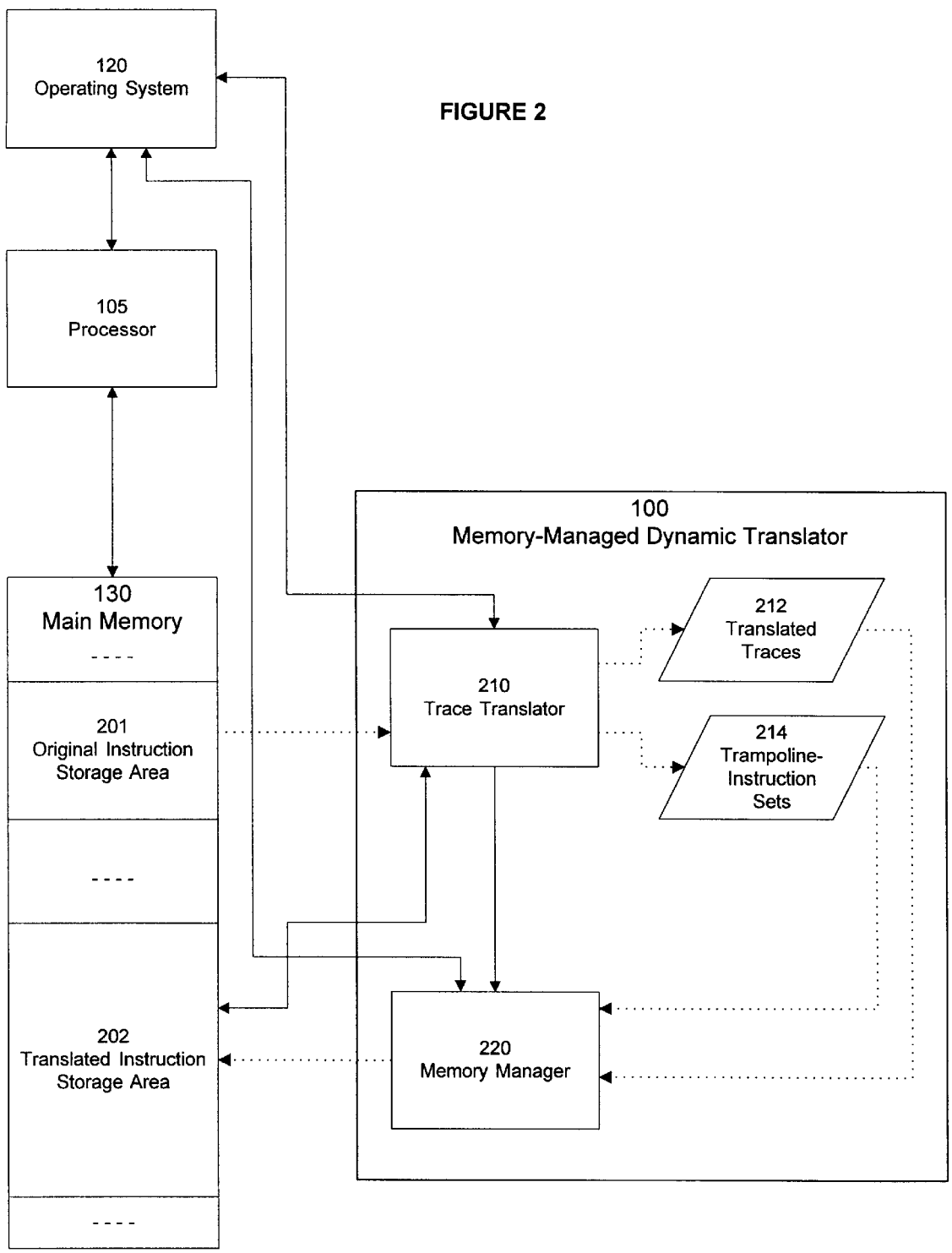
FIG. 2 is a functional block diagram of one embodiment of the memory-managed dynamic translator of the computer system of FIG. 1, including its connections to elements of the computer system.

FIG. 2 is a functional block diagram of one embodiment of memory-managed dynamic translator 100. Translator 100 includes trace translator 210 that emulates original instructions that have not been translated and identifies appropriate groups of original instructions (hot traces) for translation. Also, trace translator 210 translates, and, in the illustrated embodiment, optimizes, the hot traces. Typically, jump instructions that cause control to exit from a hot trace are translated so that control passes from them to a corresponding trampoline-instruction set. As noted, such translated jump instructions are referred to herein as "trampoline-link instructions." Trace translator 210 further generates the trampoline-instruction sets corresponding to the trampoline-link instructions. Memory-managed dynamic translator 100 also includes memory manager 220. Memory manager 220 optionally determines how many memory locations to allocate for the storage of translated traces and their corresponding trampoline-instruction sets; determines the length of chunks of memory locations within such allocated storage area; determines in which chunk to store newly translated traces and their corresponding trampoline-instruction sets; positions translated traces and their corresponding trampoline-instruction sets in the chunks; backpatches translated traces so that they jump directly to newly translated traces rather than indirectly through their corresponding trampoline-instruction sets; eliminates trampoline-instruction sets that have become dead code due to backpatching; and eliminates previously translated traces and their corresponding trampoline-instruction sets, when necessary, to make room for newly translated traces.

TRACE TRANSLATOR 210

Trace translator 210 includes original instruction processor 310, emulator 320, trace designator 330, and translator-optimizer 340. Original instruction processor 310 takes control from processor 105 in order to identify appropriate groups of original instructions for translation. In particular, original instruction processor 310 fetches the original instruction that is to be processed; determines whether it has previously been translated; if it has not previously been translated, determines whether it has been executed frequently; and, if it has not been executed frequently, passes control to emulator 320 so that it may be emulated. Emulator 320 emulates the original instruction and records the passage of control through it if it is a jump instruction. Trace designator 330 identifies a hot trace containing a frequently executed original instruction. Translator-optimizer 340 translates and optimizes hot traces.

Original Instruction Processor 310

As noted, original instruction processor 310 (not to be confused with processor 105 that is the central processing unit of user computer 110) identifies appropriate groups of original instructions for translation. Original instruction processor 310 interrupts normal execution by processor 105 to assume control or execution in a known manner, initiates the processing of instructions in original instruction storage area 201, assigns a unique identifier to original instructions as they are processed, and directs control to translated instructions as their corresponding original instructions are encountered so that the translated instructions may be executed. Also, control typically passes to original instruction processor 310 from any element of translator 100 if the address of the next instruction to be executed is not available to such element.

More specifically, operating system 120 typically passes control to original instruction processor 310 prior to executing the first original instruction of executable file 170. Original instruction processor 310 cooperates with operating system 120 in a known manner to cause processor 105 to save its current machine state and to pass control over execution of the original instructions from processor 105 to original instruction processor 310. As is well known to those skilled in the art, the current machine state typically includes the values of registers, status flags, system memory locations, the program counter, and other values (not shown) that enable processor 105 to resume conventional processing without error when such values are restored. Original instruction processor 310 makes a copy (not shown) of the machine state saved by processor 105 that, in one embodiment, may be stored in main memory 130. When the operations of translator 100 are ended or terminated, original instruction processor 310 restores the machine state values so that processor 105 may resume conventional processing.

Original instruction processor 310 fetches the first original instruction from original instruction storage area 201 and increments the saved value of the program counter to point to the second instruction. Original instruction processor 310 assigns a unique identifier to such instruction, and to each other original instruction it fetches. For purposes of illustration, it will be assumed that original instruction processor 310 fetches an original instruction, referred to hereafter as the current original instruction, from original instruction storage area 201. Original instruction processor 310, using any of a variety of known techniques such as search and compare techniques, compares the unique identifier of the current original instruction to a list of unique identifiers in a look-up table, or other appropriate data structure (not shown), or in accordance with any other known technique. The look-up table includes unique identifiers that identify original instructions that have been translated and placed in translated instruction storage area 202. If the current original instruction previously has been translated and optimized, original instruction processor 310 then passes control to such address in translated instruction storage area 202 and such translated instruction is then executed.

The circumstance is now considered in which the current original instruction has not previously been translated and optimized. Alternatively, the current original instruction may previously have been translated and placed in translated instruction storage area 202, but such translation may have been deleted in order to preserve space in main memory 130 or for another reason. As noted, original instruction processor 310 determines whether the current original instruction has been executed frequently; for example, whether it has been executed more than a predetermined number of times in one or more predetermined intervals. It is not material to the present invention what values are chosen to establish the predetermined number of executions or intervals. Advantageously, frequently executed instructions are translated rather than emulated.

Emulation of an original instruction typically requires many more machine cycles than conventional execution of the original instruction by processor 105, perhaps ten times or a hundred times more cycles. Translated instructions may execute as quickly as, or faster than, the corresponding original instruction. Thus, translation of frequently executed instructions saves time as compared with emulation of such instructions. Infrequently executed instructions are generally not translated because the time required to make the translation, which typically is a one-time only event, offsets the savings of time as compared to emulation.

Also, while emulation is typically carried out for each occurrence of the original instruction, i.e., without creating a set of emulated instructions that will be stored for later use, translation is effectuated by creating a set of translated instructions that will be stored for later use. That is, with respect to the illustrated embodiment, once the emulated instructions are executed, they typically are no longer present in memory. In contrast, translated instructions are created and then stored in memory so that they may be executed repeatedly without being re-created. If infrequently executed instructions were translated, storage space in memory would have to be allocated for the resulting translated instructions. Because space in memory typically is limited, translation generally is undesirable with respect to infrequently executed instructions.

Numerous methods and techniques may be applied to determine whether the current original instruction is a frequently executed instruction. In one embodiment, original instruction processor examines only jump instructions to determine if they are frequently executed instructions. An arc counter is assigned to each jump instruction, and the arc counter is incremented each time control passes through a corresponding arc of the jump instruction. Such counters typically are decremented, or reset to an initial value, at predetermined time intervals or at the occurrence of a predetermined event. Such predetermined event may be, for example, the processing by original instruction processor 310 or another element of translator 100 of a predetermined number of instructions. If a counter exceeds a predetermined value, frequent instruction original instruction processor 310 identifies its corresponding original instruction as one that has been executed frequently. In alternative embodiments, other techniques, including those now known or to be developed in the future, may be employed to determine whether an original instruction has been executed frequently. Also, in alternative embodiments, such determination may be made with respect to instructions other than, or in addition to, jump instructions.

If the current original instruction is determined to be frequently executed, original instruction processor 310 passes control to trace designator 320 so that a trace may be identified. Alternatively, if the current original instruction has not been executed frequently, original instruction processor 310 passes control to emulator 320.

Emulator 320

As noted, emulator 320 emulates the current original instruction. That is, emulator 320 mimics the operations that processor 105 would have applied to the current original instruction if original instruction processor 310 had not taken control of the execution of the original instructions of executable file 170. However, rather than the current original instruction being executed, emulated instructions are executed. Such emulation takes place in accordance with any of a variety of known techniques using software, firmware, hardware, or a combination thereof. The results of the execution of such emulated instructions corresponding to the current original instruction generally are identical to the results that would have been obtained by the conventional execution of the current original instruction by processor 105. In addition, emulator 320 maintains and updates the stored copy of the machine states variables so that they are the same as they would have been if processor 105 had conventionally executed the current original instruction. Thus, as noted, original instruction processor 310 may provide such updated values to processor 105 as initial conditions for resuming conventional execution if the operation of translator 100 is concluded or terminated.

In the illustrated embodiment, emulator 320 also determines whether the current original instruction is a jump instruction and, if it is, records the execution of the jump (i.e., the passage of control through the arc determined by the jump instruction) in an appropriate data structure. In particular, emulator 320 increments the arc counter for that jump instruction. Emulator 320 makes such determination in accordance with any of a variety of known techniques, such as by comparing the format or syntax of the current original instruction with a look-up table (not shown) containing the formats or syntactical rules applicable to known jump instructions. If emulator 320 determines that the current original instruction is not a jump instruction, then it returns control temporarily to original instruction processor 310 so that original instruction processor 310 may fetch the next original instruction. In an alternative embodiment, emulator 320 may fetch such subsequent original instruction directly. In the illustrated embodiment, original instruction processor 310 returns control to emulator 320, which determines whether such subsequent original instruction is a jump instruction.

Such process of examining subsequent original instructions typically continues in this manner until emulator 320 determines that the original instruction being processed is a jump instruction. As noted, the last instruction in an instruction block is illustratively assumed to be a jump instruction, which is the only jump instruction in the instruction block. However, in alternative embodiments, the last instruction need not be a jump instruction. Also, in alternative embodiments, an instruction block may include more than one jump instruction; i.e., it may include more than one basic block or instruction block as those terms are employed with respect to the illustrated embodiment. The assumptions of the illustrated embodiment are provided for clarity rather than limitation.

Thus, in the illustrated embodiment, if emulator 320 encounters a jump instruction, such instruction is determined to be the end of an instruction block. The instruction to which control passes from such jump instruction is a target instruction that begins another instruction block. Control therefore passes from the jump instruction of one instruction block, through an arc, to another instruction block. In alternative embodiments, the functions of emulator 320 may be carried out by processor 105, thereby eliminating the need for emulator 320.

Trace designator 330

As noted, original instruction processor 310 passes control to trace designator 330 if the current original instruction is determined to be a frequently executed instruction. Trace designator 330 identifies a hot trace containing the frequently executed original instruction. Trace designator 330 implements any technique that may be used to select a hot trace, now known or later to be developed, and it is not material to the present invention which of such techniques is used. Two techniques for selecting hot traces that may be employed in embodiments of the present invention are described in the following U.S. Patent Applications, the disclosures of which are hereby incorporated by reference in their entireties: U.S. Patent Application entitled "SYSTEM, METHOD, AND PRODUCT FOR JUMP-EVALUATED TRACE DESIGNATION," attorney docket number 10971492-1, naming as inventors Lacky V. Shah, James S. Mattson, Jr., and William B. Buzbee, assigned to the assignee of the present invention, and filed on May 4, 1998; and U.S. Patent Application entitled "SYSTEM, METHOD, AND PRODUCT FOR CONTROL-PATH-EVALUATED TRACE DESIGNATION," attorney docket number 10971147-1, naming as inventors Manuel E. Benitez, James S. Mattson, Jr., William B. Buzbee, and Lacky V. Shah, assigned to the assignee of the present invention, and filed on May 4, 1998.

As one illustrative example of a technique for selecting a hot trace, a trace may be designated starting with a first instruction block including the target instruction of a frequently executed jump instruction. The trace may also include a second instruction block including the target instruction of the one of the jump instructions of the first instruction block through which control has most frequently passed as compared with other jump instructions, if any, in the first instruction block. If, however, there is no jump instruction that has been executed more than a predetermined number of times, or according to other criteria, the trace may be ended with the first instruction block. Typically, more than one instruction block is included in a hot trace. Thus, the foregoing process is repeated with respect to the second instruction block; i.e., a third instruction block is identified including the target instruction of the one of the jump instructions of the second instruction block through which control has most frequently passed as compared with other jump instructions, if any, in the second instruction block. If such jump instruction has been executed more than the predetermined number of times, or other criteria are satisfied, this process continues so that additional relatively frequently executed instruction blocks are added to the hot trace. Such hot trace is hereafter referred to as the "current" hot trace, indicating that it is the hot trace upon which translator 100 currently is operating.

In such and alternative embodiments, trace designator 330 may also designate a hot trace based on, among other factors, the types of known optimization techniques that may be employed by translator-optimizer 340, as described below. For example, optimization techniques that take advantage of the behavior of instructions in loops would influence the decision of how to define a trace to provide that the trace generally is capable of identifying a loop as a translated trace. Having selected the current hot trace, trace designator 330 passes control to translator-optimizer 340.

Translator-optimizer 340

Translator-optimizer 340 translates the current hot trace in accordance with known or later-to-be-developed techniques. Such translated instructions typically are also dynamically optimized in the illustrated embodiment if known dynamic optimization techniques are applicable. Thus, such instructions may be referred to hereafter for convenience as translated and optimized instructions. However, it is not material to the present invention whether such optimization takes place. Use of the term "translated and optimized," and similar terms, will therefore be understood generally to include embodiments in which instructions are translated, but not necessarily optimized. Also, such term includes alternative embodiments in which the translated instructions are instrumented, or otherwise processed.

In accordance with any of a variety of known techniques, translator-optimizer 340 typically generates an intermediate representation (IR) of the original instructions of the current hot trace stored in original instruction storage area 201. As is well known to those skilled in the relevant art, the IR form facilitates the application of various known optimization techniques because, among other known factors, the current hot trace may be operated upon as a single block of code rather than non-contiguous instruction blocks linked by conditional jump instructions. Such known optimization techniques include loop invariant code motion, common subexpression elimination, strength reduction, and many others. All of such techniques are intended to produce a new group of instructions that executes more quickly than the original group of instructions while producing exactly the same results as the original instructions. Advantageously, the choice of which of the variety of known optimization techniques to apply, and the determination of how to apply them, are facilitated by the circumstance that all variables associated with the optimizations generally are known at run time. The translated and optimized hot traces thus generated by translator-optimizer 340 are shown in FIGS. 2 and 3 as translated traces 212.

Figure 3:
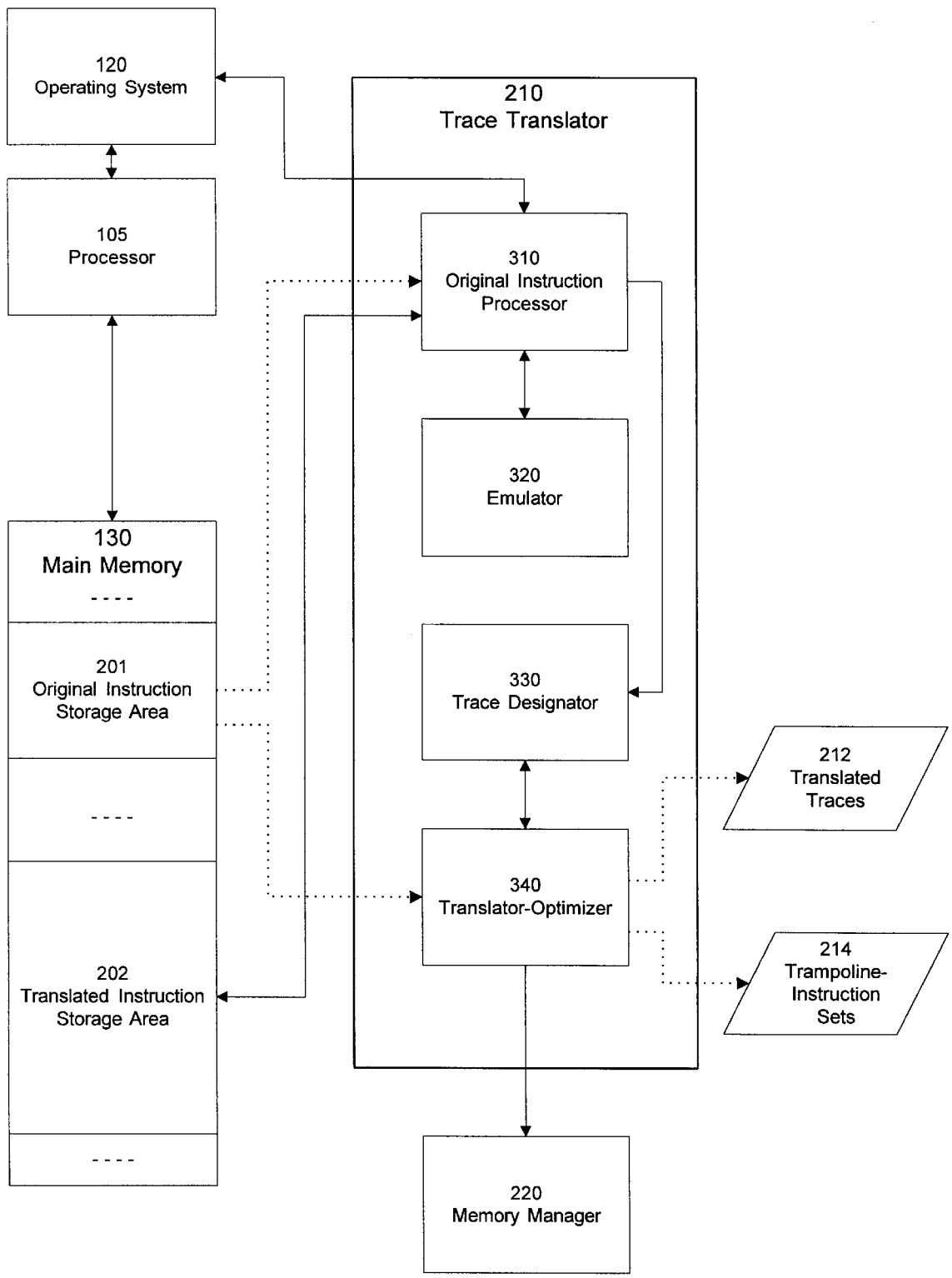
FIG. 3 is a functional block diagram of one embodiment of a trace translator of the memory-managed dynamic translator of FIG. 2, including its connections to elements of the computer system and to other elements of the memory-managed dynamic translator.

Translator-optimizer 340 also generates trampoline-instruction sets 214, shown in FIGS. 2 and 3, corresponding to each translated jump instruction in the translated-optimized trace that, when executed, causes control to pass out of the trace (referred to herein as an "external jump instruction"). An external jump instruction is a translation of an original instruction that either i s a jump instruction, or is another type of instruction through which control passed out of the trace by an unconditional fall-through. External jump instructions are translated by translator-optimizer 340 so that they direct control to their respective trampoline-instruction set rather than to their target original instructions. In the illustrated embodiment, each external jump instruction in the hot trace is translated to pass control to a corresponding trampoline-instruction set. In alternative embodiments, fewer than all external jump instructions in a hot trace may be translated to jump to a trampoline-instruction set, and, thus, fewer trampoline-instruction sets may be generated. For example, such translation and generation may occur only if an external jump instruction in the hot trace is actually executed, or is executed frequently. Any of a variety of known techniques for detecting control flow, or the frequency of control flow, through an external jump instruction may be employed in such alternative embodiments. Also, any of a variety of known, or to be developed, techniques may be applied to generate trampoline-instruction sets.

As noted, the trampoline-instruction sets generated by translator-optimizer 340 redirect control flow so that an external jump instruction in a translated hot trace that would otherwise direct control to a target original instruction instead directs control to its corresponding trampoline-instruction set and thence to original instruction processor 310. Original instruction processor 310, as noted, transfers control either to a translation of the target original instruction, if present, or to emulator 320. As will be appreciated by those skilled in the relevant art, original instruction processor 310 is provided in a known manner with an identifier of the next original instruction for processing, i.e., the current original instruction. Typically, such information is provided by the trampoline-instruction set that passed control to original instruction processor 310, and such information is provided to such trampoline-instruction set by the translated external jump instruction and/or associated translated instructions of the hot trace having the corresponding trampoline-instruction set.

MEMORY MANAGER 220

Figure 4:
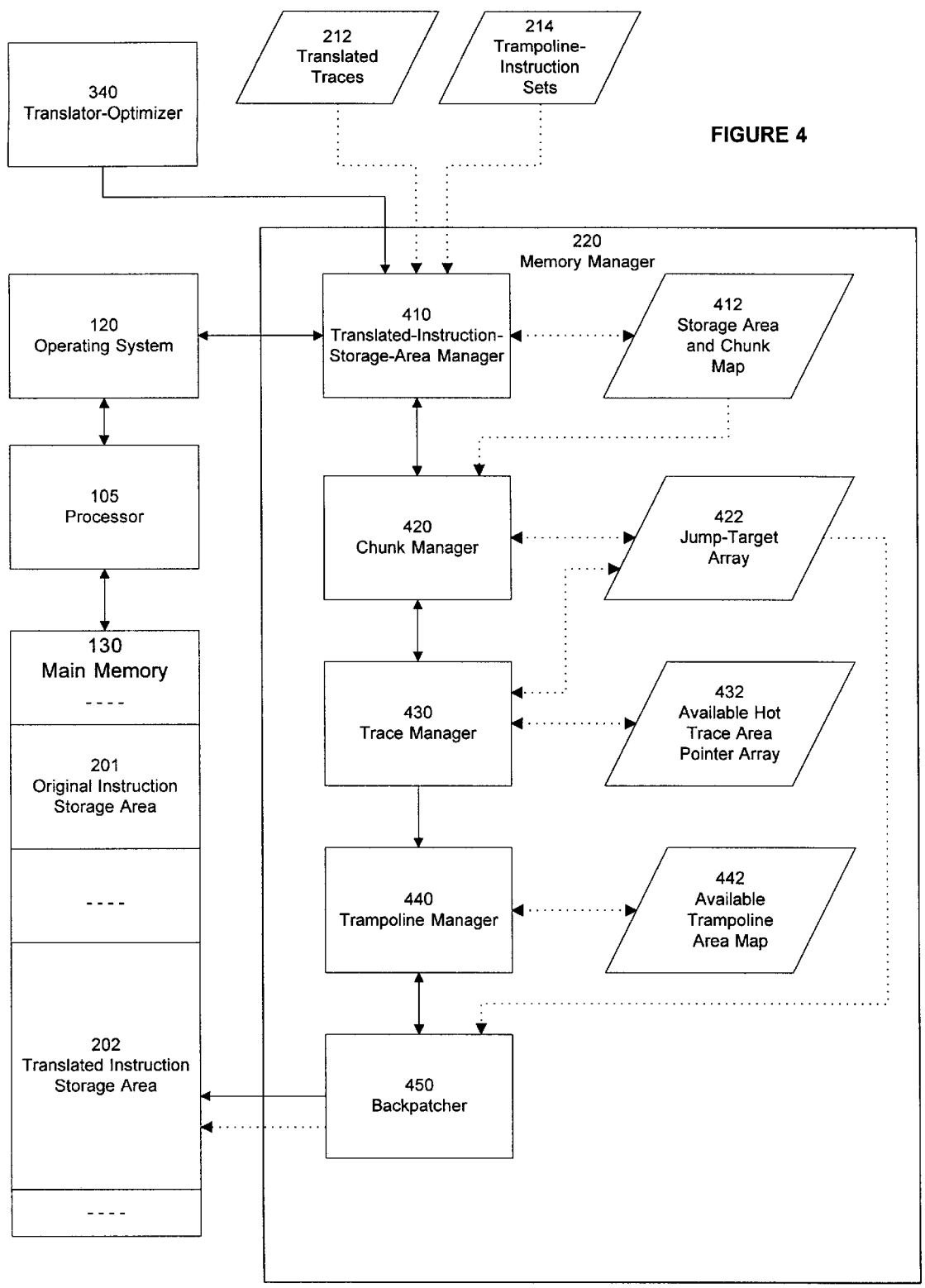
FIG. 4 is a functional block diagram of one embodiment of a memory manager of the memory-managed dynamic translator of FIG. 2, including its connections to elements of the computer system and to other elements of the memory-managed dynamic translator.

FIG. 4 is a functional block diagram of memory manager 220. Memory manager 220 includes translated-instruction-storage-area manager 410 (hereafter, simply storage-area manager 410) that determines how many memory locations to allocate for the storage of translated traces 212 and their corresponding trampoline-instruction sets 214. As noted, storage-area manager 410 may also determine either uniform or variable chunk lengths so that the translated instruction storage area may be figuratively divided into chunks. Memory manager 220 also includes chunk manager 420 that determines in which chunk to store a newly translated trace and its corresponding trampoline-instruction sets. Chunk manager 420 may also cause previously translated traces and their corresponding trampoline-instruction sets to be eliminated by trace manager 430 in order to make room for newly translated traces. Further included in memory manager 220 are trace manager 430 and trampoline manager 440 that respectively position translated traces and their corresponding trampoline-instruction sets in the chunks, and maintain a record of such positioning. Both trace manager 430 and trampoline manager 440 also selectively eliminate translated traces and trampoline-instruction sets, respectively. Backpatcher 450 also is included in memory manager 220. Backpatcher 450 backpatches translated traces so that, if possible, they jump directly to newly translated traces rather than indirectly through their corresponding trampoline-instruction sets. Backpatcher 450 also causes trampoline-instruction sets that have become dead code due to backpatching to be eliminated by trampoline manager 440. In circumstances in which it is not possible to jump directly from a translated trace to a newly translated trace, backpatcher 450 changes the trampoline-instruction set corresponding to such jump to include an indirect target address so that such jump may be effectuated using an indirect jump instruction.

For clarity and convenience, it is assumed in the illustrated embodiment that memory manager 220 positions translated hot traces and their corresponding trampoline-instruction sets in main memory 130, and that the described operations of memory manager 220 occur in relation to main memory 130. It will be understood by those skilled in the relevant art, however, that processor 105, typically in cooperation with operating system 120, may move instructions or data from main memory 130 to and from cache memory 140 to facilitate execution according to known techniques. Also, cache memory 140, or another memory storage unit, may be employed in addition to, or instead of, main memory 130. For purposes of illustration, such movements to or from cache memory 140, or alternative storage schemes, will not be considered but will be understood to be capable of inclusion in alternative embodiments.

Translated-Instruction-Storage-Area Manager 410

As noted, storage-area manager 410 determines how many memory locations to allocate for the storage of translated traces and their corresponding trampoline-instruction sets; i.e., it determines the size of translated instruction storage area 202. The size of translated instruction storage area 202 generally depends in part on machine-specific information, such as the amount of main memory 130 (and/or cache memory 140) in the machine, the portions of such memory dedicated to or reserved for other uses, and other factors. Also, the size of translated instruction storage area 202 typically depends upon the size of executable file 170, the number of applications running, the extent and nature of optimization that will be performed by trace optimizer 330 on translated traces, the size and availability of cache memory 140, and other factors that will be appreciated by those skilled in the relevant art.

In one embodiment, storage-area manager 410 employs a predetermined default size to determine the size of storage area 202, wherein the default size is based, for example, on a typical usage, on a typical usage for an executable file of a particular size, on a particular percentage of available memory in main memory 130, or on other factors. Such default size may then be adjusted based on such factors as those referred to above. Alternatively, storage-area manager 410 may determine the size of storage area 202 by receiving a user selection by known means, such as a graphical user interface, that may include the disclosure to the user of information regarding such factors.

As also noted, storage-area manager 410 also may determine uniform or variable chunk lengths; that is, it may figuratively divide translated instruction storage area 202 into chunks of typically contiguous memory locations. Such determination is generally based on two principal factors. Generally, it is desirable to position translated hot traces having a common control path as close to each other in translated instruction storage area 202 as possible. Such close packing generally reduces jump overhead in the event that a control path from one such hot trace to another such hot trace is taken at run time. Also, it generally is desirable to position translated hot traces not further from their corresponding trampoline-instruction sets than the machine-specific shortest jump distance for a type of jump instruction that is, or may be, included in a hot trace. The reason is again to reduce jump overhead.

Close packing of hot traces and their trampoline-instruction sets has an additional benefit in certain embodiments. As noted, when the instructions of such hot traces or trampoline-instruction sets are executed, processor 105 may move groups of such instructions from translated instruction storage area 202 in main memory 130 to a cache memory 140 for faster execution. However, if an instruction in cache memory 140 passes control to an instruction that was left behind in main memory 130, processor 105 must go back to fetch that instruction and bring it, typically together with other instructions, into cache memory 140 for execution. By positioning hot traces closely together, particularly if one or more of such trace jumps to one or more of the other traces, the chances are increased that the instructions grouped together for transfer to cache memory 140 will include the instruction to which another instruction in cache memory 140 passes control. Thus, the frequency with which the processor must move instructions from main memory 130 to cache memory 140 may be reduced.

The implementation of close packing by chuck manager 420 are now described in greater detail with respect to the illustrative examples of FIGS. 5A-5D and FIG. 6. In those figures, translated instruction storage area 202 is figuratively divided into chunks, the chunks are figuratively divided into distinct hot trace storage areas and trampoline-instruction-set storage areas, and particular hot traces and trampoline-instruction sets are positioned in those storage areas.

FIG. 5A is a schematic representation of main memory 130, including translated instruction storage area 202. FIG. 5B is a more detailed schematic representation of translated instruction storage area 202 showing its figurative division into chunks 510A through 510N, generally and collectively referred to hereafter as chunks 510. FIGS. 5C and 5D show two alternative schemes for designating chunks, resulting in chunks 510A and 510N, respectively.

With reference to FIG. 5C, chunk 510A is shown as including three contiguous areas of memory locations, beginning with initial memory location 530A that is at the "top" of chunk 510A. Such figurative division of chunk 510A is achieved by storage-area manager 410 in accordance with any of a variety of known, or later-to-be-developed, techniques. For example, storage-area manager 410 may record start and/or end memory locations for each such figurative division in an appropriate data structure such as storage area and chunk map 412. Storage-area manager 410 may similarly record in map 412, corresponding to each such figurative division, a flag or other indicator of whether the figurative division is to be used to store hot traces or to store trampoline-instruction sets.

Figure 6:
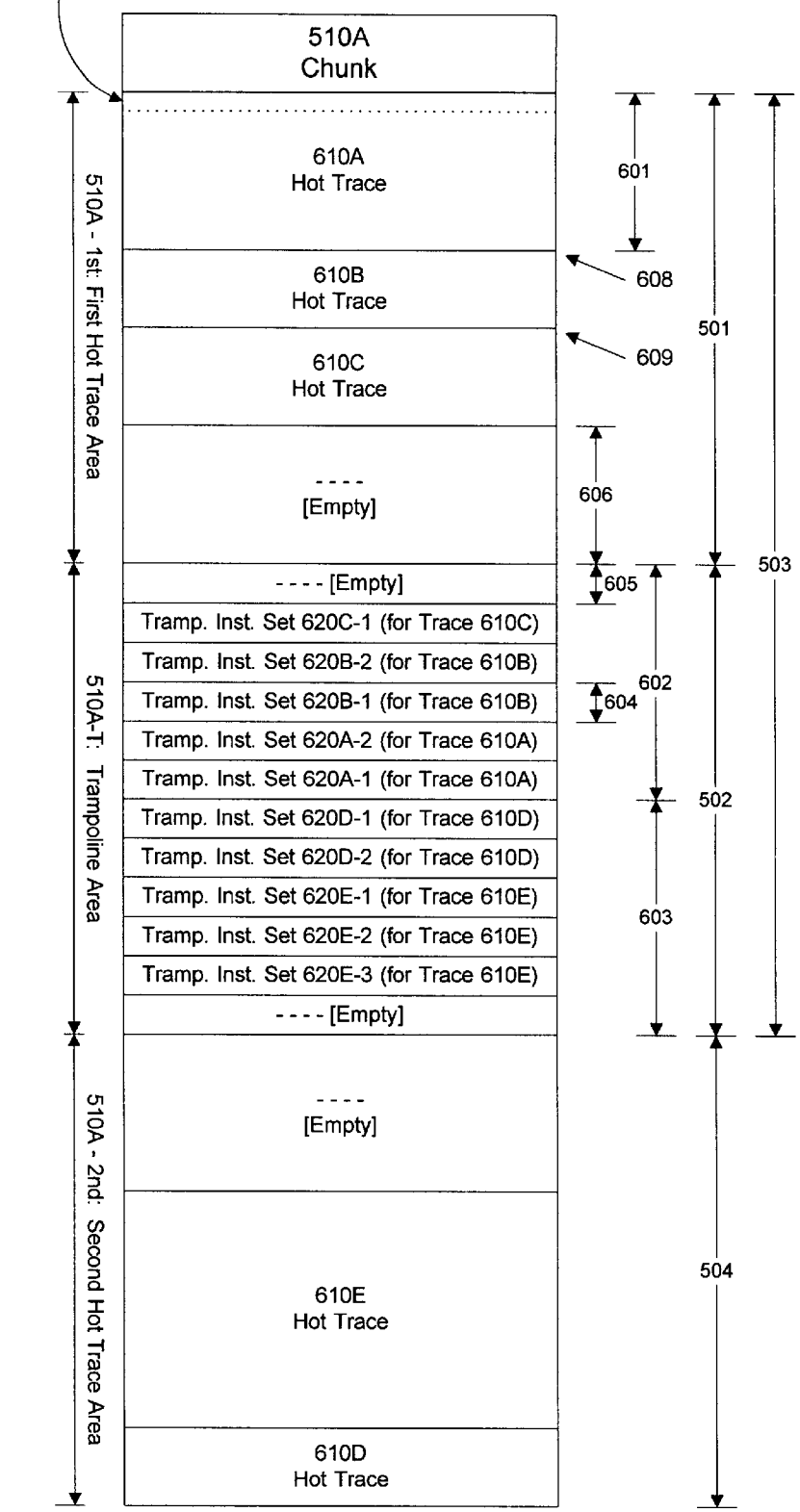
FIG. 6 is a more detailed schematic representation of one embodiment of the exemplary, chunk of FIG. 5C showing the positioning in such chunk of hot traces and their corresponding trampoline-instruction sets.

Thus, in the illustrated example, storage-area manager 410 designates a first hot trace area within chunk 510A, labeled 510A-1st in FIG. 5C, for the storing of hot traces. (In other embodiments in which translated traces need not be hot traces, such areas are referred to more generally as "translated trace areas.") Similarly, storage-area manager 410 designates a trampoline area within chunk 510A, labeled 510A-T in FIG. 5C, for the storing of trampoline-instruction sets corresponding to trampoline-link instructions of the hot traces stored in area 510A-1st. Areas 510A-1st and 510A-T are contiguous with respect to each other and have lengths represented by lines 501 and 502, respectively, and a combined length represented by line 503. It will be understood by those skilled in the relevant art that such lengths are representative of a number of memory locations, with a larger number of memory locations represented by a correspondingly greater length. It will also be understood that such lines, and similar lines in FIGS. 5 and 6, are not necessarily drawn to scale.

Advantageously, the length of line 503, i.e., the combined size of first hot trace area 510A-1st and trampoline area 510A-T, is determined based on the machine-specific shortest jump distance. As noted, it generally is desirable to reduce jump overhead by providing that a jump instruction that may be executed within a hot trace stored in hot trace area 510A-1st be able to pass control to a target instruction in a corresponding trampoline-instruction set in trampoline area 510A-T. As also noted, such capability may be limited by the size of instruction words and other aspects of the machine-specific computer architecture. For example, a direct conditional jump may be executed if the distance between the jump instruction and the instruction to be jumped to is not more than a certain number of bytes. This jump distance is limited in certain computer architectures because the length of the instruction words constrains the number of addresses relative to the present address that can be specified in a single instruction word. Typically, such a direct conditional jump may be executed in a single execution cycle.

The jump distance may be greater for a direct unconditional jump than for a direct conditional jump because it may not be necessary to allocate space in the instruction word to hold references to information to be compared, as may be required in an instruction word for a conditional jump. This extra space may be used to specify more distant addresses, but the distance of the jump, in certain computer architectures, is still constrained by the space available in the instruction word. For example, in the computer architecture associated with the PA-RISC processor made by Hewlett-Packard Company, an unconditional, direct jump instruction may have a target instruction located at up to 16,384 memory locations distant, as compared to a maximum jump distance of 2,048 memory locations for a conditional, direct jump. Such an unconditional jump may be rapidly executed, typically in two cycles. Direct conditional or unconditional jumping thus typically has a low jump overhead as compared to indirect jumping.

Indirect jumping is possible in which the size of the instruction word does not similarly limit the distance of the jump. This capability for long-distance jumping is achieved by referring in the jump instruction word to an indirect address that contains the address of the instruction to which control is to be transferred. The contents of more than one indirect address may be combined so that distant jumps may be accomplished. However, the number of cycles required to execute an indirect jump, typically six to 10 cycles, is generally significantly greater than for executing a direct jump. It therefore is evident that the increase in speed achieved by executing dynamically optimized traces, for example, may be significantly offset by jump overhead if indirect jumping is frequently required to jump between such traces.

Alternatively stated, in order to avoid the relatively large jump overhead of indirect jumping, it is advantageous to position hot traces, if possible, so that control passes from one hot trace to another through a direct, rather than an indirect, jump instruction. As described in greater detail below, such direct jumping between translated instructions is achieved by backpatching a translated jump instruction to jump directly to a translated target instruction. Generally prior to such backpatching, the translated jump instruction jumps to its corresponding trampoline-instruction set so that backpatcher 450 may then determine if backpatching is possible (e.g., if the target instruction has been translated). If backpatching is not possible, control passes to original instruction processor 310. It is evident that it is also therefore desirable for the jump between a translated jump instruction and its corresponding trampoline-instruction set to be a direct jump. The present invention therefore is advantageously applied to computer systems operating with a reduced instructions set computer (RISC) processor such as the PA-RISC processor, or other type of processor in which there is a penalty, i.e., greater jump overhead, for jumping to a distant address. For example, a RISC processor typically employs instruction words of a fixed length and therefore, as noted, distant jumps typically require the use of indirect jumping having a high jump overhead.

The length of line 503 therefore generally may not exceed the distance required to execute a worst-case jump. As noted, such a jump occurs when a jump instruction of a type having the machine-specific shortest jump distance is positioned in a chunk such that the distance between it and its target trampoline instruction is the greatest possible distance between instructions in the chunk. This relationship is further described with respect to FIG. 6 that shows chunk 510A in greater detail.

In particular, FIG. 6 shows memory locations in first hot trace area 510A-1st of chunk 510A that are occupied by exemplary hot traces 610A through 610E, generally and collectively referred to as hot traces 610. FIG. 6 also shows memory locations in trampoline area 510A-T that are occupied by exemplary corresponding trampoline-instruction sets 620A-1 through 620E-3, generally and collectively referred to as trampoline-instruction sets 620. The operations by which hot traces 610 and trampoline-instruction sets 620 are selected to be stored and positioned in chunk 510A are described below with respect to chunk manager 420, trace manager 430, and trampoline manager 440. Because hot trace 610A is illustratively shown as stored at the top of chunk 510A, the first translated instruction of hot trace 610A is located at initial memory location 530A of chunk 510A.

It is now assumed for illustrative purposes that the translated instruction at location 530A is an external jump instruction (ie., one that passes control out of the hot trace), although typically it is a target instruction as described above with respect to the operations of trace translator 210. It is also assumed for illustrative purposes that trampoline area 510T is figuratively divided by storage-area manager 410 into two parts, one for the storage of trampoline-instruction sets corresponding to the hot traces of first hot trace area 510A-1st, and the other for the storage of trampoline-instruction sets corresponding to the hot traces of second hot trace area 510A-2nd. Each of such areas is contiguous with the hot trace areas with which they correspond. Such division of the trampoline area need not occur, however, in alternative embodiments. That is, trampoline-instruction sets corresponding to the hot traces of either first or second hot trace areas 510A-1st and 510A-2nd may be stored in any location within trampoline area 510T in such embodiments.

With respect to the illustrated embodiment, the portion of trampoline area 510T used for storage of trampoline-instruction sets corresponding to the hot traces of first and second hot trace areas 510A-1st and 510A-2nd have lengths represented by lines 602 and 603, respectively. Prior to backpatching, the translated jump instruction at location 530A transfers control to its corresponding trampoline-instruction set, which is shown in FIG. 6 as trampoline-instruction set 620A-1. (Note that one hot trace may have many trampoline-instruction sets, each of which is associated with an external jump instruction from the hot trace.) As shown, it is assumed for worst-case illustrative purposes that trampoline-instruction set 620A-1 is positioned at the bottom of the portion of trampoline area 510T that is used for storage of trampoline-instruction sets corresponding to hot traces in first hot trace area 510A. Thus, under this assumption, the external jump from the translated jump instruction at location 530A to its target in trampoline-instruction set 620A-1 is the maximum distance over which a jump may occur in chunk 510A. This maximum distance is shown in FIG. 6 as the sum of the distances represented by lines 501 and 602 (assuming again for worst-case illustrative purposes that the target instruction is the last instruction in trampoline-instruction set 620A-1, which need not be the case).

The distance represented by the sum of lines 501 and 602 are determined by storage-area manager 410 to be no greater than the machine-specific shortest jump distance. Such relationship provides that, even if the translated jump instruction assumed to be located at initial memory location 530A is a type of jump instruction capable of the shortest jump distance of any type of jump instruction that may be stored in first hot trace area 510A-1st, the jump may be accomplished. For example, it is assumed for illustrative purposes that such jump instruction is a direct conditional jump and that such a jump instruction, in the architecture of user computer 110, has a maximum jump distance of 2,048 memory locations. Such an assumption is appropriate, for example, with respect to the architecture of the PA-8000 RISC processor, which provides that instruction words in main memory 130 typically are 32 bits long and in which the condition of the jump is stored in a portion of the instruction word and the target offset is stored in another such portion. Thus, the size of the portion of chunk 510A represented by the sum of lines 501 and 602 is determined by storage-area manager 410 to be no greater than 2,048 memory locations in this illustrative example. Similarly, under similar assumptions regarding a worst-case jump in the illustrative example, the size of the portion of chunk 510A represented by the sum of line 504 (the size of second hot trace area 510A-2nd) and line 603 (the size of the portion of trampoline area 510T used for the storage of corresponding trampoline-instruction sets) is no greater than 2,048 memory locations.

By determining the size of chunk 510A based on the assumed possible occurrence of such worst-case jumps, storage-area manager 410 provides that any jump instruction in any hot trace stored in chunk 510A will be capable of passing control directly to its corresponding trampoline-instruction set. The size of chunk 510A under such assumption therefore may be determined by storage-area manager 410 to be twice the machine-specific shortest jump distance, or 4,096 memory locations. In alternative embodiments, the size of chunk 510A may be greater than twice the machine-specific shortest jump distance. For example, it may be provided that chunk 510A is only used to store hot traces that have translated jump instructions of a type not including conditional direct jumps, wherein such other types (such as an unconditional direct jump) have a maximum jump distance that is greater than the machine-specific shortest jump distance. As another example, the portions of first and second hot trace areas 510A-1st and 510A-2nd, respectively, most distant from trampoline area 510T (i. e., the top and bottom areas of chunk 510A, respectively, in the illustrated embodiment) may be used to store hot traces, or portions thereof, not containing any direct jump instructions that are external jumps. Thus, in both such exemplary types of alternative embodiments, chunk sizes may be variable based on placement of hot traces selected by the types of jump instructions included therein, on the occurrence of translated instructions not including certain types of external jump instructions, or other factors.

Still further alternative embodiments may provide chunk sizes that are less than twice the machine-specific shortest jump distance. For example, trampoline area 510T need not be figuratively divided into portions corresponding to first and second hot trace areas 510A-1st and 510A-2nd, respectively. That is, it may be provided that trampoline-instruction sets corresponding to hot traces in either of such hot trace areas may be positioned anywhere within trampoline area 510T. Such an arrangement may, for instance, simplify the task of determining where such trampoline-instruction sets are positioned.

In such an arrangement, a worst-case jump from first hot trace area 510A-1st is of a distance represented by the sum of lines 501 and 502 (such sum also is represented by line 503). Similarly, a worst-case jump from second hot trace area 510A-2nd is of a distance represented by the sum of lines 504 and 502 (equal to line 503 assuming that the sizes of the two hot trace areas are equal). The size of chunk 510A therefore may vary within a range that depends on the size of trampoline area 510T. A maximum size of twice the machine-specific shortest jump distance is approached when the size of trampoline area 510T approaches zero. Such a situation may occur, for example, as the jump instructions in chunk 510A are backpatched and, thus, all corresponding trampoline-instruction sets are eliminated. In some aspects of such embodiments, the memory locations freed by the elimination of trampoline code may be reallocated for the storage of hot traces. A minimum size equal to the machine-specific shortest jump distance is approached when the size of first and second hot trace areas 510A-1st and 510A-2nd (assumed for clarity to be equal to each other in size) approaches zero.

Storage-area manager 410 thus establishes the chunk size under such embodiments based on a determination of the ratio of the sizes of the first and second hot trace areas to the size of the corresponding trampoline area in the same chunk. Such a determination may be based, for example, on a default ratio between a hot trace and its corresponding trampoline-instruction sets. Storage-area manager 410 may determine such a default ratio based on typical ratios during trial periods between the sizes, or numbers of jump instructions, of hot traces and the sizes of trampoline-instruction sets required to bounce control from such jump instructions, or in another manner. In some implementations, such default ratio may be user-adjusted or established in accordance with known techniques, such as the use of a graphical user interface.

The value of the default ratio may vary depending on a variety of factors. For example, trace translator 210 generally may designate hot traces in a manner such that they contain large numbers of external jump instructions. If so, then the size of trampoline areas required to receive control from such external jumps generally is larger than if fewer external jumps were included. Also, if the method by which hot traces are designated typically results in hot traces with large numbers of instructions, the portion of a chunk required to store a hot trace generally is greater than if the hot trace had been smaller.

In one embodiment, the size of trampoline code area 510A-T is determined by storage-area manager 410 in accordance with a process of dynamic updating. That is, an initial allocation of space for area 510A-T is based on a default ratio representing a typical ratio between the space needed for hot traces and for their corresponding trampoline-instruction sets.

For example, experimentation or experience with a particular method of defining hot traces may indicate that a ratio of six to one with respect to space for hot traces compared to their corresponding trampoline-instruction sets is typical. This default ratio may be looked up by storage-area manager 410 from a look-up table (not shown) according to known means, or retrieved in accordance with any other known or to-be-developed technique. In some implementations, the default ratio may also depend upon the type of executable file involved. As applied to the illustrative example of FIG. 5C and the exemplary default ratio of 6:1, the length of line 502 may be determined by solving the equations in which the length of line 502 is equal to one-sixth of the sum of lines 501 and 504, and in which the sum of the length of lines 501 and 502 (or 504 and 502) is equal to the machine-specific shortest jump distance.

After chunk 510A has been filled with hot traces and their corresponding trampoline-instruction sets, it may be the case that the actual ratio between the sizes of the hot trace areas and corresponding trampoline areas significantly varies from the default ratio. In some embodiments employing dynamic updating, storage-area manager 410 may thus replace the default ratio with the latest actual ratio. This actual ratio may then be used by storage-area manager 410 with respect to subsequent chunks, and/or with respect to modifying existing chunks. In some implementations, such dynamic updating may include taking a number of actual ratios into account in order to calculate a running average of such ratios, or to otherwise smooth them. The resulting smoothed ratio may, in such implementations, be used by storage-area manager 410 in place of the default ratio. Any of a variety of known statistical or related methods may be used to obtain such smoothing and thus reduce inefficient use of hot trace and trampoline areas in chunks.

In alternative embodiments, the ratio between hot trace and trampoline areas may be set to be uniform in all chunks, for example by using the default ratio for all chunks. Such uniformity may be desirable, for example, if there is sufficient space in main memory 130 to store all hot traces and corresponding trampoline-instruction sets so that there need not be a substantial concern for closely packing to conserve memory space. In yet other embodiments, the default ratio may be user-selected, and may be dynamically adjustable or not.

Chunk 510N, as shown in FIG. 5D, is another example of a chunk having a size that is less than twice the machine-specific shortest jump distance. Chunk 510N has only one hot trace area, labeled 510N-1st in FIG. 5 and having a length represented by line 505, and one area for the storage of corresponding trampoline-instruction sets, labeled 510N-T and having a length represented by line 506. In a chunk that thus is arranged, a worst-case jump is from initial memory location 530N at the top of chunk 510N to a possible target instruction of a trampoline-instruction set located at the bottom of chunk 510N; i.e., a distance represented by the sum of lines 505 and 506. Thus, storage-area manager 410 determines such chunk size to be equal to the machine-specific shortest jump distance. As noted above with respect to chunk 510A, such chunk size may be increased based on the storage at the top of the chunk of translated instructions not including jump instructions. The arrangement represented by chunk 510N may be advantageous in some embodiments, in which a chunk of the same arrangement is contiguous to it, because the size of trampoline areas separating hot trace areas generally may be smaller than in the configuration of chunk 510A. That is, for example, the length of line 506 generally may be shorter than the length of line 502 because trampoline area 510N-T need store fewer trampoline-instruction sets than trampoline area 510A-T (because the former bounces control both from hot trace area 510A-1st and 510A-2nd, whereas the latter bounces control only from hot trace area 510N-1st). Thus, the likelihood may be improved that a direct jump longer than the machine-specific shortest jump distance (such as from an unconditional, direct, jump instruction) may be made between hot traces stored in first hot trace area 510N-1st and another hot trace storage area in such contiguous chunk.

In the illustrated embodiment, storage-area manager 410 determines the size of translated instruction storage area 202 and determines a uniform or default chunk size the first time that control passes to it. Typically, storage-area manager 410 need not re-determine such sizes upon subsequently receiving control. In alternative embodiments, however, either or both of such sizes may be so re-determined based on the number, size, type of included jump instructions, or other attributes of hot traces identified and translated by trace translator 210. Such sizes may also be re-determined in alternative embodiments based on input from a user in accordance with known techniques such as a graphical user interface. In the illustrated embodiment, storage-area manager 410 passes control to chunk manager 420.

Chunk Manager 420

As noted, chunk manager 420 determines in which chunk to store a newly translated trace and its corresponding trampoline-instruction sets. More specifically, chunk manager 420 determines in which hot trace area of which chunk (for example, there are two such areas in exemplary chunk 510A, and one such area in exemplary chunk 510N) to store such trace and trampoline-instruction sets. In the illustrated embodiment, such determination is made by preferentially storing the newly translated trace in a hot trace area that already contains another trace that may pass control to it. Such preferential storing is described with reference to some of the exemplary hot traces and corresponding trampoline-instruction sets shown in FIG. 6.

In particular, it is assumed for illustrative purposes that hot trace 610A is the first hot trace designated and optimized by trace translator 210. Chunk manager 420 may therefore select any hot trace area to receive hot trace 610A because all chunks typically are initially empty, the memory locations of translated instruction storage area 202 having been appropriately initialized as is well known to those skilled in the art. As noted, translator-optimizer 340 typically generates trampoline-instruction sets for each of the external jump instructions of hot trace 610A. For illustrative purposes, it is assumed that there are two such external jump instructions, resulting in the generation of trampoline-instruction sets 620A-1 and 620A-2 corresponding to the first and second of such external jump instructions, respectively. Thus, for example, if control enters hot trace 610A and passes through such first external jump instruction, control is re-directed to trampoline-instruction set 620A-1 rather than to the target original instruction of such first external jump instruction, which is located in original instruction storage area 201. Trampoline-instruction set 620A-1 then bounces control to original instruction processor 310 so that the target original instruction may be emulated by emulator 320, or considered by trace designator 330 for translation as part of a hot trace. As noted, original instruction processor 310 may also pass control directly to translated instruction storage area 202 if the target original instruction has been translated.

It is illustratively assumed that chunk manager 420 selects chunk 510A into which to store hot trace 610A (for example, in hot trace area 510A-1st) and its corresponding trampoline-instruction sets 620A-1 and 620A-2 (in trampoline area 510-T). As is described below, trace manager 430 positions hot trace 610A within hot trace area 510A-1st and enters into jump-target array 422 unique identifiers of the target original instructions of the external jump instructions of hot trace 610A.

It is further assumed for illustrative purposes that trace translator 210 then generates a second hot trace that is a translation of a group of original instructions stored in original instruction storage area 201. Chunk manager 420 determines whether any of such original instructions corresponding to the second hot trace are target instructions of a previously translated hot trace, such as hot trace 610A. Such determination may be made in accordance with any of a variety of known, or to-be-developed, techniques. For example, unique identifiers for the trace's original starting and ending instructions may be compared to the unique identifiers in jump-target array 422 in accordance with search and compare, or other known or to-be-developed, techniques. Such unique identifiers may be, for example, hash representations of the original instruction addresses in which the sequence of original instructions is preserved by the values of the unique identifiers. Thus, in this illustrative example, if a unique identifier of a target instruction has a value falling between the values of the unique identifiers of the starting and ending instructions of the original instructions of a hot trace, the target instruction is one of the instructions of the hot trace.

It is assumed for illustrative purposes that chunk manager 420 thus determines that the original instructions from which the second hot trace was generated includes an original instruction that is a target original instruction of an external jump instruction of hot trace 610A. Because control may thus pass from hot trace 610A, through such external jump instruction, to such other hot trace, it is advantageous to store such other hot trace in the same hot trace area as is stored hot trace 610A. The two hot traces will then be closely packed so that such transfer of control may be done by a direct jump instruction having low jump overhead, rather than by an indirect jump instruction having high jump overhead. For example, if the second hot trace is hot trace 610B, chunk manager 420 advantageously stores it in the same hot trace area as is stored hot trace 610B, which is first hot trace area 510A-1st as shown in FIG. 6. The corresponding trampoline-instruction sets of hot trace 610B, which are sets 620B-1 and 620B-2 in the illustrated embodiment, thus are also stored in trampoline area 510A-T of chunk 510A.

It is now assumed for illustrative purposes that a third hot trace is to be stored by chunk manager 420. In the manner just described, chunk manager 420 determines whether either of hot traces 610A or 610B include external jump instructions that may pass control to a target instruction in the original instructions from which the third hot trace was translated. (A hot trace having such external jump instruction having a target in the third hot trace is hereafter referred to for convenience as a "control-passing hot trace.") If so, then chunk manager 420 preferentially stores the third hot trace in the hot trace storage area in which the control-passing hot trace is stored. More generally, there may be a number of control-passing hot traces identified in jump-target array 422, and they need not all be stored in the same hot trace area. In the illustrated embodiment, chunk manager 420 stores the third hot trace in the hot trace area in which is stored the first of such control-passing hot traces encountered in jump-target array 422. However, in alternative embodiments, the hot trace area for storing the third hot trace may be determined based on a variety of other factors, such as which hot trace storage area has the most empty space, which contains the largest number of control-passing hot traces, which has the most frequently executed control-passing hot traces, and other factors. The frequency of execution may be determined by any of a variety of known means, such as instrumentation of the hot trace and incrementation of an associated counter.

As noted, chunk manager 420 may also cause trace manager 430 to eliminate previously translated traces and their corresponding trampoline-instruction sets in order to make room for newly translated hot traces. For example, it is assumed for illustrative purposes that hot traces 610A, 610B, and 610C have been stored in first hot trace area 510A-1st, as shown in FIG. 6. The number of remaining memory locations (i. e., the size of the unused storage) in first hot trace area 510A-1st in represented in FIG. 6 by line 606. It is further assumed that another hot trace (not shown, but referred to hereafter as the "new hot trace") is provided to chunk manager 420 for storage and that the length of the new hot trace is greater than the length of line 606. Chunk manager 420 determines the length of line 606 (i.e., the amount of available memory in first hot trace area 510A-1st) by comparing the size of (i. e., total number of memory locations in) such area to a pointer, unique to that area, that is stored in available hot trace area pointer array 432. As described below, trace manager 430 maintains such pointer so that it points to the first unoccupied memory location in first hot trace area 510A-1st.

Having determined that there is insufficient room in first hot trace area 510A-1st in which to store the new hot trace, chunk manager 420 preferentially selects another hot trace area in which to store the new hot trace. Such selection is done in the manner described with respect to the selection of first hot trace storage area 510A-1st. If there is room in such other hot trace area, chunk manager provides trace manager 430 with an identification of such other hot trace area in accordance with any of a variety of known techniques, and passes control to trace manger 430. If there is no room in such other hot trace area, chunk manager 420 continues examining remaining hot trace areas in like manner.

It is now illustratively assumed that there is no hot trace area in translated instruction storage area 202 having sufficient room to store the new hot trace. In some embodiments, chunk manager 420 notifies storage-area manager 410 of the insufficiency of space. Storage-area manager 410 may then modify the size of one of the hot trace areas that passes control to the new hot trace; for example, if there are no external jump instructions in the hot traces of such hot trace area that are of the type of jump instruction having the machine-specific shortest jump distance. Alternatively, storage-area manager 410 may increase the size of translated instruction storage area 202 in order to create additional chunks in which to store hot traces. In the illustrated embodiment, however, chunk manager 420 does not invoke storage-area manager 410, but, rather, passes control to trace manager 430 so that it may eliminate one or more hot traces from a selected one of the hot trace areas, as described below. Any of a variety of known techniques, such as the setting of a flag, may be used by chunk manager 420 to indicate to trace manager 430 that such elimination is to be done.

In some implementations, it may occur that a hot trace is too long to fit even in an entirely empty hot trace area; that is, the length of the hot trace is longer than the length of any hot trace area. If so, chunk manager 420 employs any of a variety of known techniques to provide that such a hot trace is stored in a portion of memory that is not necessarily within translated instruction storage area 202, or is within translated instruction storage area 202 but not within a chunk. One such known technique is to initiate a "malloc," or allocate-memory set of instructions. After determining a hot trace storage area in which to store the hot trace, chuck manager 420 passes control to trace manager 430.

Trace Manager 430 Trace manager 430, as noted, positions each newly translated hot trace in a chunk (more particularly, in a hot trace area of a chunk) and maintains a record of such positioning. The positioning may be done in any of a variety of ways, but it generally is advantageous to position hot traces contiguously with one another beginning either at the top or bottom of the hot trace area. In this manner, fragmentation of a multiplicity of empty areas within the hot trace area is avoided. Thus, advantageously, there is only one empty area in each hot trace area. For convenience of illustration, it is assumed that chunk manager 420 has selected first hot trace area 510A-1st of chunk 510A, and that trace manager 430 packs hot trace 610A starting at the top of first hot trace area 510A-1st, e.g., starting with initial memory location 530A, as shown in FIG. 6. It will be understood that trace manager 430, in alternative implementations, could have started packing hot traces at the bottom of first hot trace area 510A-1st, or at any other location such that hot trace 610A fits within first hot trace area 510A-1st.

Trace manager 430, in accordance with any of a variety of known methods, updates the look-up table (not shown) that is used by original instruction processor 310 to identify original instructions that have been translated and placed in translated instruction storage area 202. That is, trace manager 430 inserts entries in such look-up table to include unique identifiers of the original instructions from which hot trace 610A was generated, as well as corresponding unique identifiers of the translated instructions of hot trace 610A. In some implementations, all such original and translated instructions are so represented in the look-up table, while in other implementations only the first and last, or other representative group of, instructions are included. Thus, as noted, if control passes to original instruction processor 310 and it fetches an original instruction that corresponds in such look-up table with a unique identifier for a translated instruction in a hot trace, original instruction processor 310 transfers control to the translated instruction for execution.

Also, trace manager 430 updates jump-target array 422 to record unique identifiers of the target original instructions of external jump instructions of hot trace 610A. One implementation of array 422, for example, includes a record for each external jump instruction of each hot trace positioned by trace manager 430 (although such records are eliminated if the hot trace is eliminated, as noted). Each record typically includes one field in which to store a unique identifier of the target original instruction of a hot-trace external jump instruction, and another field in which to store a unique identifier of the address in translated instruction storage area 202 of the hot-trace external jump instruction. Thus, a target original instruction that has been translated to be part of a newly translated hot trace is correlated with the address of the external jump instruction of the hot trace from which control may pass to the newly translated hot trace.

In addition, trace manager 430 stores a record of the portion of first hot trace area 510A-1st that is occupied by hot trace 610A. Such recording may be accomplished in accordance with any of a variety of known techniques, such as recording a pointer to the first unoccupied memory location. Such pointer may be stored, for example, in a data structure in main memory 130 such as available hot trace area pointer array 432. Such an array typically would have a record for each hot trace area and two fields in each such record: one in which to store a unique identifier of the hot trace area, and another in which to store the pointer to the first available memory location in such hot trace area. In the illustrative example, in which packing from the top down is assumed and only hot trace 610A has been positioned, a pointer unique to first hot trace area 510A-1st thus points to the memory location in first hot trace area 510A-1st immediately below the last memory location occupied by an instruction of hot trace 610A. When hot trace 610B is added below and contiguous with hot trace 610A in accordance with the illustrated embodiment, such pointer is changed to point to the memory location immediately following the last memory location occupied by an instruction of hot trace 610B. In FIG. 6, the memory location to which this pointer points (i.e., when only hot trace 610A has been stored) is represented by line 608, and the second location to which this pointer points (i.e., when hot trace 610B has been added below hot trace 610A) is represented by line 609.

Typically, storage-area manager 410 allocates sufficient space for translated instruction storage area 202 to accommodate hot traces designated and translated by trace translator 210. Thus, typically, hot traces remain where they are initially positioned rather than being eliminated or moved. Therefore, it generally is advantageous to employ a simple pointer arrangement as described with respect to the illustrated embodiment that points only to the first available memory location in a hot trace area and thus is highly efficient with respect to the allocation of space when hot traces are added. Such a pointer arrangement need not generally be as efficient with respect to the deallocation of space when hot traces are eliminated or moved, because such operations typically occur relatively infrequently.

The case is now considered, however, in which chunk manager 420 determines that there is insufficient room to store a new hot trace and, as noted, passes control to trace manager 430 to eliminate one or more hot traces to make room for the new hot trace. In the illustrated embodiment, trace manager 430 determines which hot trace or traces to eliminate by employing a first-in-first-out (FIFO) scheme, which may be implemented in accordance with any of a variety of known techniques. In alternative embodiments, however, other criteria may be employed instead of, or in combination with, a FIFO scheme. For example, the hot trace or traces to be eliminated may be those that occupy the most space; occupy space in a particular location, such as contiguous with, or furthest from, a trampoline area; have been executed relatively infrequently, or relatively not recently, in comparison to other hot traces; or, if more than one hot trace is to be eliminated, are contiguous and have a combined "age" under a FIFO scheme that is older than other contiguous hot traces having a sufficient combined size to make room for the new hot trace. Also, a hot trace or traces may be selected for elimination based on the circumstance that one or more other hot traces in the same hot trace area has an external jump instruction that may pass control to the new hot trace. In accordance with any of a variety of known techniques, such as setting a flag and passing information in arguments, trace manager 430 provides to trampoline manager 440 the information that one or more hot traces have been eliminated and the identification of such hot traces. Thus, trampoline manager 440 may eliminate the trampoline-instruction sets corresponding to the eliminated hot traces.

In the event that trace manager 430 eliminates a hot trace or traces, it also eliminates from jump-target array 422 the unique identifiers of the targets of the external jump instructions of such hot traces. Thus, a newly translated hot trace having a translated instruction corresponding to the target original instruction of the eliminated hot trace will not preferentially be placed by chunk manager 420 in the hot trace area in which the eliminated hot trace or traces were located (unless another hot trace that passes control to the newly translated hot trace is also located in that hot trace area). Further, in accordance with any of a variety of known techniques, trace manager 430 updates the look-up table (not shown) that is used by original instruction processor 310 to identify original instructions that have been translated and placed in translated instruction storage area 202. That is, entries for the unique identifiers of original instructions corresponding to the eliminated hot trace are eliminated from such look-up table.

In addition, trace manager 430 advantageously re-packs the remaining hot traces in the hot trace area in which hot traces were eliminated so as to reestablish a contiguous area of hot traces, if necessary. For example, it is assumed for illustrative purposes that trace manager 430 has selected hot trace 610A for elimination so that a new hot trace may be stored in first hot trace area 510A-1st. The empty space left by the elimination of hot trace 610B is filled by shifting upward the hot traces below it, if any, which is hot trace 610C in the illustrative example. As is evident, in an alternative implementation in which the packing is done from the bottom up, the empty space left by the elimination of a hot trace is filled by shifting downward the hot traces above it, if any. Trace manager 430 updates the look-up table used by original instruction processor 310, so that the new locations of the re-packed hot traces are accurately represented.

In alternative embodiments, such re-packing need not be done, and the empty spaces may be filled by trace manager 430 with newly translated hot traces of appropriate size. However, in such alternative embodiments, a simple pointer arrangement typically is not appropriate. Rather, trace manager 430 maintains a map, in accordance with any of a variety of known techniques and typically including a data storage area in main memory 130, to maintain a record of memory usage within hot trace areas. Such an alternative scheme may be particularly appropriate for use in a machine in which the amount of main memory 130 that may be allocated to translated instruction storage area 202 is relatively small, or in applications in which the number and/or size of hot traces is anticipated to be large.

In alternative implementations, other techniques may be used to record the location of available memory in hot trace areas. For example, both the beginning and end of each hot trace may be recorded in an appropriate data structure in main memory 130. However, such other techniques generally may not be as efficient in positioning a newly translated hot trace since more memory-usage information must be accessed and processed.

Trampoline Manager 440

Trampoline manager 440 performs essentially the same operations with respect to the positioning of trampoline-instruction sets and recording memory usage in trampoline areas as trace manager 430 performs with respect to the positioning of hot traces and recording memory usage in hot trace areas, respectively. That is, trampoline manager 440 positions each newly translated trampoline-instruction set corresponding to a newly translated hot trace in the trampoline area that is in the same chunk as was selected by chunk manager 420 for the storage of the newly translated hot trace. As with respect to the positioning of hot traces, it generally is advantageous to position trampoline-instruction sets to be contiguous with one another beginning either at the top or bottom of the trampoline area in order to reduce fragmentation.

Trampoline manager 440 also maintains a record of such positioning; i e., a record of memory locations in the trampoline area that are available for the storage of additional trampoline-instruction sets. However, the technique by which such recording is done typically differs from that described above with respect to trace manager 430. As noted, trace manager 430 typically uses a simple pointer to the first available memory location. This arrangement typically is sufficient because hot traces are relatively infrequently eliminated. In contrast, and as is described below in greater detail with respect to the operations of backpatcher 450, trampoline-instruction sets frequently are eliminated even though the hot traces to which they correspond are not eliminated. Such frequent elimination of trampoline-instruction sets occurs because hot traces are backpatched to pass control from one hot trace to another without bouncing off a trampoline-instruction set. Thus, with respect to trampoline manager 440, memory usage information should be available in a form that is efficient for both the allocation and the elimination of trampoline-instruction sets.

Generally, trampoline manager 440 thus records the usage of memory locations in trampoline areas by storing information regarding the start and end of each trampoline-instruction set in each of such areas. Such recording may be accomplished in accordance with any of a variety of known techniques, such as recording starting and ending pointers for each trampoline-instruction set in available trampoline area map 442, or another appropriate data structure in main memory 130. Such a data structure typically would have a record for each trampoline-instruction set and three fields in each such record: a first field in which to store a unique identifier of the trampoline-instruction set, a second field in which to store a pointer to its starting memory location, and a third field in which to store a pointer to its ending memory location.

In the event that backpatcher 450 backpatches an external jump instruction of a hot trace so that its corresponding trampoline-instruction set may be eliminated, control returns to trampoline manager 440 to eliminate such set. Also, trampoline manager 440 advantageously re-packs the remaining trampoline-instruction sets in that trampoline area so as to reestablish a contiguous area of trampoline-instruction sets, and adjusts the entries in map 442 accordingly. In an alternative embodiment, backpatcher 450 may undertake such elimination and repacking without passing control back to trampoline manager 440.

In one aspect of the illustrated embodiment, trampoline manager 440 may routinely or selectively allocate space in trampoline areas in groups of a predetermined number of memory locations. There are two reasons that such grouping is advantageous. First, it typically is necessary that the trampoline-instruction set pass certain information along with control so that control enters the correct target instruction with all of the data that is necessary to execute the target instruction in the manner intended. Such need for passing information, or "arguments," will be evident to those skilled in the relevant art, and it also will be evident that there are many known techniques that may employed to store the arguments and to pass them to the target instruction. One such technique is to store the arguments in, for example, three of a predetermined group of four instructions making up a trampoline-instruction set. The fourth instruction in this example typically is a direct jump instruction that passes control to the target instruction. Rather than determining for each set whether such argument-storing instructions are needed and, if so, how many, it typically is advantageous to routinely allocate sufficient memory locations (e.g., four in the illustrative example) without individual determinations of need. This arrangement typically does not waste significant amounts of memory because the number of instructions required in a trampoline-instruction set typically is small. In other embodiments, however, such as one intended for use on a machine with a small amount of available memory, individual determinations of need for trampoline-instruction-set words may be made by trampoline manager 440.

The second reason for routinely grouping trampoline-instruction sets into a predetermined number of memory locations arises when it is determined by backpatcher 450 that the hot-trace external jump instruction that passes control to the trampoline-instruction set passes control to a target instruction that also has been translated. As noted, such external jump instruction thus typically is backpatched so that it directly passes control to the translated target instruction. However, such direct backpatched jump may not be possible if the distance between the external jump instruction and its translated target instruction is greater than is attainable by a direct jump in the architecture of user computer 110. In such a case, an indirect jump typically is required. In terms of the illustrative example, the three words that were used to store arguments may be used, in combination if necessary and in accordance with any of a variety of known techniques, to store an address of the target instruction. Backpatcher 450 backpatches the hot trace so that the arguments are passed appropriately with respect to this indirect jump through the trampoline-instruction set. As is evident, the trampoline-instruction set typically is not eliminated in such circumstances since the indirect address stored therein is required to effectuate the indirect jump from the hot trace to the translated target instruction.

Backpatcher 450

As noted, backpatcher 450 backpatches hot traces so that, if possible, they jump directly to newly translated hot traces rather than indirectly through their corresponding trampoline-instruction sets. Backpatcher 450 also causes trampoline-instruction sets that have become dead code due to backpatching to be eliminated by trampoline manager 440. Backpatcher 450 determines whether an external jump instruction of a translated trace should be so backpatched, and thence eliminated, by accessing jump-target array 422. For example, it is illustratively assumed that one or more of the entries of target original instruction identifiers in array 422 matches an identifier of one or more of the instructions in the newly translated hot trace. That is, backpatcher 450 scans the records of array 422 to determine which, if any, of the fields containing such identifiers matches an identifier of an original instruction from which the newly translated hot trace was translated. Such scanning may be done in accordance with any of a variety of known techniques, such as search and compare techniques. If a match is found, then backpatcher 450 examines the field in such matching record that contains the unique identifier of the address in translated instruction storage area 202 of the corresponding hot-trace external jump instruction. Backpatcher 450 then backpatches the external jump instruction so that it passes control directly to the corresponding translated target instruction in the newly translated hot trace.

Provided that such backpatching may be accomplished using a direct jump instruction (i.e., the distance between the jump instruction and target instruction is not too large for a direct jump), backpatcher 450 advantageously causes trampoline manager 440 to eliminate the trampoline-instruction set because it is dead code. As noted, if the distance is too large for a direct jump, backpatcher 450 changes the trampoline-instruction set to include an indirect target address so that such jump may be effectuated using an indirect jump instruction in the trampoline-instruction set.

Having now described one embodiment of the present invention, it should be apparent to those skilled in the relevant art that the foregoing is illustrative only and not limiting, having been presented by way of example only. Many other schemes for distributing functions among the various functional elements of the illustrated embodiment are possible in accordance with the present invention. The functions of any element may be carried out in various ways in alternative embodiments. For example, numerous variations are contemplated in accordance with the present invention to identify frequently executed instructions and hot traces; record control flow through hot traces; translate, instrument, or optimize instructions; determine the length of chunks; determine in which chunk to position translated hot traces and/or their corresponding trampoline-instruction sets; determine in which hot trace area to position a hot trace; determine which hot traces and corresponding trampoline-instruction sets to eliminate to make room in memory for more hot traces; generate translations of jump instructions and other instructions; pass variables, register contents, and the like; and implement backpatching.

The system, method, and product described above are intended to be applicable to commercial systems such as might be used for managing memory usage in a dynamic translator. Such commercial systems include those employing a dynamic translator with dynamic optimization, and/or used for other purposes including cross-platform translation, instrumentation, profiling, and other alterations of executable files without the need to recompile such files.

There are many possible variations of the architecture for the data structures referred to above, including, for example, map 412 or arrays 422, 432, or 442. It will be evident to those skilled in the relevant art that such data structures may be stored in main memory 130, or one or more could be stored in cache memory 140, memory storage device 150, or another device for storing data. As also will be evident to those skilled in the relevant art, the values in data structures generally are initialized or re-initialized in accordance with any of a variety of known techniques to provide that such values are accurate. Such initializations or re-initializations of data structures therefore are assumed, but may not be further described, with respect to the various data structures, including flags, of the illustrated embodiment or alternative embodiments. Similarly, memory storage areas, such as original instruction storage area 201 and translated instruction storage area 202 are separately illustrated in the drawings for clarity, but, in other embodiments, may be combined, subdivided, and otherwise arranged. Such storage areas may be in main memory 130, or one or more could be stored in cache memory 140, memory storage device 150, or another device for storing data, and they may be initialized and re-initialized in accordance with known techniques. Also, as noted, there are various configurations of hot trace areas and trampoline areas within chunks that may be used in alternative embodiments.

In addition, it will be understood by those skilled in the relevant art that control and data flows between and among functional elements of the invention and various data structures may vary in many ways from the control and data flows described above. More particularly, intermediary functional elements (not shown) may direct control or data flows; the functions of various elements may be combined, divided, or otherwise rearranged to allow parallel processing or for other reasons; intermediate data structures may be used; various described data structures may be combined; the sequencing of functions or portions of functions generally may be altered; and so on. As an additional, non-limiting, example, control flow to and from original instruction processor 310 may, in alternative embodiments, be accomplished directly between or among other functional elements of translator 100 without the involvement of original instruction processor 310. Also, in alternative embodiments, the functions of managers 410, 420, 430, and 440, and backpatcher 450, as described above, may be combined, divided, or otherwise rearranged. For example, chunk manager 420, rather than translated-instruction-storage-area manager 410, may determine the length of chunks. As yet a further non-limiting example, the functions of trace manager 430 and trampoline manager 440 may be combined in a single element, or combined with those of backpatcher 450. Numerous other embodiments, and modifications thereof, are contemplated as falling within the scope of the present invention as defined by appended claims and equivalents thereto.

What is claimed is:

1. A method for positioning a plurality of translated traces and a plurality of trampoline-instruction sets in a computer memory unit having a plurality of memory locations, comprising:

(1) determining a plurality of chunks of the computer memory unit, each having one of a plurality of chunk lengths based on one or more machine-specific shortest jump distances;

(2) determining within each of the plurality of chunks at least one translated trace area for positioning one or more of the translated traces; and (3) determining within each of the plurality of chunks at least one trampoline area for positioning of one or more of the trampoline-instruction sets.

2. The method of claim 1, further comprising:

(4) positioning within a first translated trace area a first translated trace including a first trampoline-link instruction of a type of jump instruction having a first machine-specific shortest jump distance.

3. The method of claim 2, further comprising:

(5) positioning within a first trampoline area in the same chunk as the first translated trace a first trampoline-instruction set having a first target trampoline instruction that may receive control from the first trampoline-link instruction, wherein a first distance from the positioned first trampoline-link instruction to the positioned first trampoline target instruction is not greater than the first machine-specific shortest jump distance.

4. The method of claim 1, further comprising:

(4) positioning within a first translated trace area one or more translated traces including a first translated trace, each having at least one trampoline-link instruction;

(5) after positioning the one or more translated traces, positioning within a second translated trace area a second translated trace having a first number of translated instructions occupying the first number of memory locations, wherein the second translated trace area is determined to be the first translated trace area when at least one of the one or more translated traces includes at least one external jump instruction translated from an original instruction having an original target instruction from which a first instruction of the first number of translated instructions is translated.

5. The method of claim 4, further wherein:

the second translated trace area is determined not to be the first translated trace area when a second number of memory locations not occupied by any of the one or more translated traces in the first translated trace area is less than the first number.

6. The method of claim 4, wherein:

when a second number of memory locations not occupied by any of the one or more translated traces in the first translated trace area is less than the first number, step (5) includes eliminating a group of at least one of the one or more translated traces, wherein the group occupies a third number of memory locations equal to or greater than the first number less the second number.

7. The method of claim 4, further comprising:

(6) when at least one of the one or more translated traces includes a first external jump instruction translated from an original instruction having a first original target instruction from which a first translated instruction of the first number of translated instructions is translated, backpatching the first external jump instruction to pass control to the first translated instruction.

8. The method of claim 7, wherein:

step (6) includes backpatching the first external jump instruction to pass control directly to the first translated instruction.

9. The method of claim 1, further comprising:

(4) positioning within a first translated trace area one or more translated traces including a first translated trace, each having at least one trampoline-link instruction;

(5) after positioning the one or more translated traces, positioning within a second translated trace area a second translated trace including a first translated target instruction that is translated from a first original target instruction, (6) positioning within a first trampoline area in the same chunk as the first translated trace a first trampoline-instruction set having a first plurality of trampoline instructions including a first target trampoline instruction that may receive control from the first trampoline-link instruction, wherein a first distance from the positioned first trampoline-link instruction to the positioned first trampoline target instruction is not greater than the first machine-specific shortest jump distance; and (7) when the first translated trace includes a first external jump instruction translated from an original instruction having the first original target instruction, wherein the first external jump instruction has a first machine-specific shortest jump distance, and when the distance from the first external jump instruction to the first translated target instruction is greater than the first machine-specific shortest jump distance, backpatching the first external jump instruction to pass control indirectly to the first translated instruction through the first trampoline target instruction using an indirect address included in one or more of the first plurality of trampoline instructions.

10. A method for positioning a plurality of translated traces and a plurality of trampoline-instruction sets in a computer memory unit having a plurality of memory locations, comprising:

(1) determining a first chunk length of a first chunk of the computer memory unit based on a first of one or more machine-specific shortest jump distances; and (2) positioning within the first chunk (a) a first translated trace including a first trampoline-link instruction of a type of jump instruction having a first machine-specific shortest jump distance, and (b) a first trampoline-instruction set having a first target trampoline instruction that may receive control from the first trampoline-link instruction, wherein a first distance from the positioned first trampoline-link instruction to the positioned first trampoline target instruction is not greater than the first machine-specific shortest jump distance.

11. The method of claim 10, wherein:

the first machine-specific shortest jump distance is the shortest distance of any of the one or more machine-specific shortest jump distances.

12. The method of claim 10, wherein:

each trampoline-instruction set includes one or more target trampoline instructions, each of the translated traces includes one or more trampoline-link instructions that each may cause control to pass to a corresponding one of the target trampoline instructions, and step (1) includes determining the first chunk length to be the same as a longest of any distance from any trampoline-link instruction positioned in the first chunk to its corresponding target trampoline instruction positioned in the first chunk, wherein the longest distance is not longer than the machine-specific shortest jump distance.

13. The method of claim 12, wherein:

each of the plurality of trampoline-instruction sets may receive control from only one trampoline-link instruction.

14. The method of claim 10, wherein:

step (1) includes determining that the first chunk length is not greater than the first machine-specific shortest jump distance.

15. The method of claim 10, wherein:

step (1) includes determining that the first chunk length is not greater than twice the first machine-specific shortest jump distance.

16. The method of claim 10, wherein:

step (1) includes determining that the first chunk length is at least as great as the first machine-specific shortest jump distance.

17. The method of claim 10, further comprising:

(3) designating within the first chunk a first translated trace area A having a plurality of contiguous first area A memory locations; and (4) designating within the first chunk a first trampoline area having a plurality of contiguous first trampoline area memory locations, wherein step 2(*a*) includes positioning the first translated trace in the first translated trace area A, and step 2(*b*) includes positioning the first trampoline-instruction set in the first trampoline area.

18. The method of claim 17, wherein:

the first translated trace area A and the first trampoline area are contiguous with respect to each other.

19. The method of claim 18, wherein:

the first machine-specific shortest jump distance is not greater than a sum of a first area A maximum distance and a first trampoline area maximum distance, wherein the first area A maximum distance is equal to a first longest distance between any two of the plurality of contiguous first area A memory locations, and the first trampoline area maximum distance is equal to a second longest distance between any two of the plurality of contiguous first trampoline area memory locations.

20. The method of claim 19, further comprising:

(5) designating within the first chunk a first translated trace area B having a plurality of contiguous first area B memory locations, wherein none of the first area B memory locations are the same as any of the first area A memory locations, and further wherein the first translated trace area B and the first trampoline area are contiguous with respect to each other.

21. The method of claim 20, wherein:

the first machine-specific shortest jump distance is not greater than a sum of a first area B maximum distance and the first trampoline area maximum distance, wherein the first area B maximum distance is equal to a third longest distance between any two of the plurality of contiguous first area B memory locations.

22. The method of claim 21, wherein:

step (2) further comprises (c) after positioning the first translated trace, a second translated trace having a first number of translated instructions occupying the first number of memory locations, wherein the second translated trace is positioned in first translated trace area A when a second number of first area A memory locations not occupied by the first translated trace and any other of the plurality of translated traces is not less than the first number, and wherein the second translated trace is positioned in first translated trace area B when the second number is less than the first number.

23. The method of claim 10, wherein:

the first translated trace is a hot trace.

24. The method of claim 10, wherein:

the first translated trace is dynamically optimized.

25. The method of claim 10, wherein:

the first translated trace is dynamically instrumented.

26. A method for generating and positioning a translated trace and a corresponding trampoline-instruction set in at least one computer memory unit having stored therein a plurality of original instructions of an executable file, the method comprising:

(1) designating a trace of one or more original instructions;

(2) translating the trace to provide a translated trace including a trampoline-link instruction of a type of jump instruction having a machine-specific shortest jump distance;

(3) generating a corresponding trampoline-instruction set including a target trampoline instruction that may receive control from the trampoline-link instruction;

(4) determining a chunk of the computer memory unit having a chunk length based on the machine-specific shortest jump distance;

(5) positioning the translated trace within the chunk; and (6) positioning within the chunk the corresponding trampoline-instruction set, wherein a distance from the positioned trampoline-link instruction to the positioned trampoline target instruction is not greater than the machine-specific shortest jump distance.

27. The method of claim 26, wherein:

the trace is a hot trace.

28. The method of claim 26, wherein:

the translated trace is dynamically optimized.

29. The method of claim 26, wherein:

the translated trace is dynamically instrumented.

30. A memory-managed dynamic translator for use in a computer system including at least one memory unit having a plurality of memory locations and having stored therein a plurality of original instructions of an executable file, comprising:

a trace translator constructed and arranged to identify one or more traces of original instructions for translation, each trace including at least one external jump instruction;

translate a first trace to provide a first translated trace, including translating a first external jump instruction of the first trace into a first trampoline-link instruction; and generate a first trampoline-instruction set corresponding to the first trampoline-link instruction; and further comprising a memory manager constructed and arranged to determine a plurality of chunks of the memory unit, each having one of a plurality of chunk lengths based on one or more machine-specific shortest jump distances; and position the first translated trace and the first trampoline-instruction set in a first chunk.

31. The memory-managed dynamic translator of claim 30, wherein:

the trace translator is further constructed and arranged to emulate at least one original instruction.

32. The memory-managed dynamic translator of claim 30, wherein:

the trace translator is further constructed and arranged to dynamically optimize the first trace.

33. The memory-managed dynamic translator of claim 30, wherein:

the memory manager is further constructed and arranged to determine a first chunk in which to position the first translated trace and the first trampoline-instruction set.

34. The memory-managed dynamic translator of claim 33, wherein:

the first chunk is determined based on a second trace being positioned in the first chunk, wherein the second trace includes a second external jump instruction translated from an original instruction having a first original target instruction from which a first translated target instruction of the first trace is translated, and wherein the first chunk includes a second trampoline-instruction set corresponding to the second external jump instruction.

35. The memory-managed dynamic translator of claim 34, wherein:

the memory manager is further constructed and arranged to backpatch the second external jump instruction so that it passes control directly to the first translated target instruction.

36. The memory-managed dynamic translator of claim 35, wherein:

the memory manager is further constructed and arranged to
when the second external jump instruction is backpatched, eliminate the second trampoline-instruction set.

37. The memory-managed dynamic translator of claim 34, wherein:

a third translated trace is positioned in the first chunk, the third translated trace and the second translated trace combined occupy a first number of memory locations, the first translated trace consists of a second number of instructions, and the first number is less than the second number, and further wherein
the memory manager is further constructed and arranged to
eliminate the third translated trace prior to positioning the first translated trace in the first chunk.

38. A memory manager for use in cooperation with a computer system including at least one memory unit having a plurality of memory locations and having stored therein a plurality of original instructions of an executable file, a plurality of translated traces, and a plurality of trampoline-instruction sets each corresponding to one of the plurality of translated traces, the memory manager comprising:

a translated-instruction storage-area manager constructed and arranged to determine a first chunk length of a first chunk of the memory unit based on a first of one or more machine-specific shortest jump distances; and a trace manager constructed and arranged to position within the first chunk
first translated trace including a first trampoline-link instruction of a type of jump instruction having a first machine-specific shortest jump distance, and
a first trampoline-instruction set having a first target trampoline instruction that may receive control from the first trampoline-link instruction,
wherein a first distance from the positioned first trampoline-link instruction to the positioned first trampoline target instruction is not greater than the first machine-specific shortest jump distance.

39. The memory manager of claim 38, wherein:

the first machine-specific shortest jump distance is the shortest distance of any of the one or more machine-specific shortest jump distances.

40. The memory manager of claim 38, wherein:

each trampoline-instruction set includes one or more target trampoline instructions, each of the translated traces includes one or more trampoline-link instructions that each may cause control to pass to a corresponding one of the target trampoline instructions, and
the translated-instruction storage-area manager further is constructed and arranged to determine the first chunk length to be the same as a longest of any distance from any trampoline-link instruction positioned in the first chunk to its corresponding target trampoline instruction positioned in the first chunk, wherein the longest distance is not longer than the machine-specific shortest jump distance.

41. The memory manager of claim 40, wherein:

each of the plurality of trampoline-instruction sets may receive control from only one trampoline-link instruction.

42. The memory manager of claim 38, wherein:

the translated-instruction storage-area manager further is constructed and arranged to determine that the first chunk length is not greater than the first machine-specific shortest jump distance.

43. The memory manager of claim 38, wherein:

the translated-instruction storage-area manager further is constructed and arranged to determine that the first chunk length is not greater than twice the first machine-specific shortest jump distance.

44. The memory manager of claim 38, wherein:

the translated-instruction storage-area manager further is constructed and arranged to determine that the first chunk length is at least as great as the first machine-specific shortest jump distance.

45. The memory manager of claim 38, wherein the translated-instruction storage-area manager further is constructed and arranged to
designate within the first chunk a first translated trace area A having a plurality of contiguous first area A memory locations, and
designate within the first chunk a first trampoline area having a plurality of contiguous first trampoline area memory locations,
and wherein the trace manager further is constructed and arranged to position the first translated trace in the first translated trace area A, and position the first trampoline-instruction set in the first trampoline area.

46. The memory manager of claim 45, wherein:

the first translated trace area A and the first trampoline area are contiguous with respect to each other.

47. The memory manager of claim 46, wherein:

the first machine-specific shortest jump distance is not greater than a sum of a first area A maximum distance and a first trampoline area maximum distance, wherein the first area A maximum distance is equal to a first longest distance between any two of the plurality of contiguous first area A memory locations, and the first trampoline area maximum distance is equal to a second longest distance between any two of the plurality of contiguous first trampoline area memory locations.

48. The memory manager of claim 47, wherein:

the translated-instruction storage-area manager further is constructed and arranged to designate within the first chunk a first translated trace area B having a plurality of contiguous first area B memory locations, wherein none of the first area B memory locations are the same as any of the first area A memory locations, and further wherein the first translated trace area B and the first trampoline area are contiguous with respect to each other.

49. The memory manager of claim 48, wherein:

the first machine-specific shortest jump distance is not greater than a sum of a first area B maximum distance and the first trampoline area maximum distance, wherein the first area E; maximum distance is equal to a third longest distance between any two of the plurality of contiguous first area B memory locations.

50. The memory manager of claim 49, wherein:
the trace manager further is constructed and arranged to
    after positioning the first translated trace, position a second translated trace having a first number of translated instructions occupying the first number of memory locations, wherein the second translated trace is positioned in first translated trace area A when a second number of first area A memory locations not occupied by the first translated trace and any other of the plurality of translated traces is not less than the first number, and wherein the second translated trace is positioned in first translated trace area B when the second number is less than the first number.

51. The memory manager of claim 45, wherein:
the translated-instruction storage-area manager further is constructed and arranged to determine the first chunk length based on a default ratio between a default translated trace-area length and a default trampoline-area length.

52. The memory manager of claim 51, wherein:
the default ratio is user-adjustable.

53. The memory manager of claim 51, wherein:
the translated-instruction storage-area manager further is constructed and arranged to determine a length of the first trampoline area by dynamic updating.

54. The memory manager of claim 51, wherein:
the first number of memory locations is determined based on a length of the executable file.

55. The memory manager of claim 51, wherein:
the first number of memory locations is determined based on a default value.

56. The memory manager of claim 51, wherein:
the first number of memory locations is user-selected.

57. The memory manager of claim 38, wherein:
the translated-instruction storage-area manager further is constructed and arranged to
    determine a plurality of chunks of the computer memory unit, each having one of a plurality of chunk lengths based on one or more machine-specific shortest jump distances;
    determine within each of the plurality of chunks at least one translated trace area for positioning one or more of the translated traces; and
    determine within each of the plurality of chunks at least one trampoline area for positioning of one or more of the trampoline-instruction sets, and further wherein
the trace manager further is constructed and arranged to
    position within a first translated trace area one or more translated traces including a first translated trace, each having at least one trampoline-link instruction;
    after positioning the one or more translated traces, position within a second translated trace area a second translated trace having a first number of translated instructions occupying the first number of memory locations, wherein the second translated trace area is determined to be the first translated trace area when at least one of the one or more translated traces includes at least one external jump instruction translated from an original instruction having an original target instruction from which a first instruction of the first number of translated instructions is translated.

58. The memory manager of claim 57, further wherein:
the second translated trace area is determined not to be the first translated trace area when a second number of memory locations not occupied by any of the one or more translated traces in the first translated trace area is less than the first number.

59. The memory manager of claim 57, wherein:
the trace manager further is constructed and arranged to eliminate a group of at least one of the one or more translated traces, wherein the group occupies a third number of memory locations equal to or greater than the first number less the second number, when a second number of memory locations not occupied by any of the one or more translated traces in the first translated trace area is less than the first number.

60. The memory manager of claim 57, further comprising:
a backpatcher constructed and arranged so that, when at least one of the one or more translated traces includes a first external jump instruction translated from an original instruction having a first original target instruction from which a first translated instruction of the first number of translated instructions is translated, the backpatcher backpatches the first external jump instruction to pass control to the first translated instruction.

61. The memory manager of claim 60, wherein:
the backpatcher further is constructed and arranged to backpatch the first external jump instruction to pass control directly to the first translated instruction.

62. The memory manager of claim 57, wherein:
the trace manager further is constructed and arranged to
    position within a first translated trace area one or more translated traces including a first translated trace, each having at least one trampoline-link instruction;
    after positioning the one or more translated traces, position within a second translated trace area a second translated trace including a first translated target instruction that is translated from a first original target instruction,
    position within a first trampoline area in the same chunk as the first translated trace a first trampoline-instruction set having a first plurality of trampoline instructions including a first target trampoline instruction that may receive control from the first trampoline-link instruction, wherein a first distance from the positioned first trampoline-link instruction to the positioned first trampoline target instruction is not greater than the first machine-specific shortest jump distance; and further wherein
the backpatcher further is constructed and arranged to,
    when the first translated trace includes a first external jump instruction translated from an original instruction having the first original target instruction, wherein the first external jump instruction has a first machine-specific shortest jump distance, and when the distance from the first external jump instruction to the first translated target instruction is greater than the first machine-specific shortest jump distance, backpatch the first external jump instruction to pass control indirectly to the first translated instruction through the first trampoline target instruction, using an indirect address included in one or more of the first plurality of trampoline instructions.

63. The memory manager of claim 38, wherein:
the translated-instruction storage-area manager is further constructed and arranged to determine a translated instruction storage area of the memory unit including a first number of memory locations for storing translated traces and their corresponding trampoline-instruction sets.

64. The memory manager of claim 38, wherein:
the first translated trace is a hot trace.

65. The memory manager of claim 38, wherein:
the first translated trace is dynamically optimized.

66. The memory manager of claim 38, wherein:
the first translated trace is dynamically instrumented.

67. A computer system having at least one central processing unit (CPU) and at least one memory unit having a set of memory-management instructions for execution by the at least one CPU comprising:
   a set of translated-instruction storage-area manager instructions that, when executed by the at least one CPU,
      determines a plurality of chunks of the memory unit, each having one of a plurality of chunk lengths based on one or more machine-specific shortest jump distances;
      determines within each of the plurality of chunks at least one translated trace area for positioning one or more of the translated traces; and
      determines within each of the plurality of chunks at least one trampoline area for positioning of one or more of the trampoline-instruction sets.

68. The computer system of claim 67, wherein the set of memory-management instructions further comprises:
   a set of trace manager instructions that, when executed by the at least one CPU,
      positions within a first translated trace area a first translated trace including a first trampoline-link instruction of a type of jump instruction having a first machine-specific shortest jump distance, and
      positions within a first trampoline area in the same chunk as the first translated trace a first trampoline-instruction set having a first target trampoline instruction that may receive control from the first trampoline-link instruction, wherein a first distance from the positioned first trampoline-link instruction to the positioned first trampoline target instruction is not greater than the first machine-specific shortest jump distance.

69. Storage media that contains software that, when executed on an appropriate computing system having at least one central processing unit (CPU) and at least one memory unit, performs a method for memory management in a dynamic translator comprising:
   (1) determining a plurality of chunks of the memory unit, each having one of a plurality of chunk lengths based on one or more machine-specific shortest jump distances;
   (2) determining within each of the plurality of chunks at least one translated trace area for positioning one or more of the translated traces; and
   (3) determining within each of the plurality of chunks at least one trampoline area for positioning of one or more of the trampoline-instruction sets.

70. The storage media of claim 69, wherein the method further comprises:
   (4) positioning within a first translated trace area a first translated trace including a first trampoline-link instruction of a type of jump instruction having a first machine-specific shortest jump distance; and
   (5) positioning within a first trampoline area in the same chunk as the first translated trace a first trampoline-instruction set having a first target trampoline instruction that may receive control from the first trampoline-link instruction, wherein a first distance from the positioned first trampoline-link instruction to the positioned first trampoline target instruction is not greater than the first machine-specific shortest jump distance.

71. A computer program product for use with an appropriate computing system having at least one central processing unit (CPU) and at least one memory unit, the computer program product comprising a computer usable medium having embodied therein computer readable program code comprising instructions for performing, when executed, method steps, the method steps comprising:
   (1) determining a plurality of chunks of the memory unit, each having one of a plurality of chunk lengths based on one or more machine-specific shortest jump distances;
   (2) determining within each of the plurality of chunks at least one translated trace area for positioning one or more of the translated traces; and
   (3) determining within each of the plurality of chunks at least one trampoline area for positioning of one or more of the trampoline-instruction sets.

72. The computer program product of claim 71, wherein the method steps further comprise:
   (4) positioning within a first translated trace area a first translated trace including a first trampoline-link instruction of a type of jump instruction having a first machine-specific shortest jump distance; and
   (5) positioning within a first trampoline area in the same chunk as the first translated trace a first trampoline-instruction set having a first target trampoline instruction that may receive control from the first trampoline-link instruction, wherein a first distance from the positioned first trampoline-link instruction to the positioned first trampoline target instruction is not greater than the first machine-specific shortest jump distance.

* * * * *

UNITED STATES PATENT AND TRADEMARK OFFICE
CERTIFICATE OF CORRECTION

PATENT NO.    : 6,223,339 B1
DATED         : April 24, 2001
INVENTOR(S)   : Shah et al.

It is certified that error appears in the above-identified patent and that said Letters Patent is hereby corrected as shown below:

<u>Column 32,</u>
Line 23, delete "Trace Manager 430 Trace manager 430, as noted, posi-" and insert therefor -- <u>Trace Manager 430</u>

Trace manager 430, as noted, posi --

<u>Column 43,</u>
Line 46, before "first translated" insert -- a --

<u>Column 45,</u>
Line 1, delete "area E;" and insert therefor -- area B --

<u>Column 46,</u>
Line 62, after "instruction" delete ","

Signed and Sealed this

Eighth Day of April, 2003

JAMES E. ROGAN
*Director of the United States Patent and Trademark Office*